US012699692B2

(12) United States Patent
Hoang et al.

(10) Patent No.: US 12,699,692 B2
(45) Date of Patent: Aug. 4, 2026

(54) TECHNIQUES FOR EFFICIENT ENCODING IN NEURAL SEMANTIC PARSING SYSTEMS

(71) Applicant: Oracle International Corporation, Redwood Shores, CA (US)

(72) Inventors: Cong Duy Vu Hoang, Melbourne (AU); Poorya Zaremoodi, Melbourne (AU); Thanh Tien Vu, Brisbane (AU); Gioacchino Tangari, Sydney (AU); Mark Edward Johnson, Sydney (AU); Thanh Long Duong, Melbourne (AU); Vishal Vishnoi, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 225 days.

(21) Appl. No.: 18/409,676

(22) Filed: Jan. 10, 2024

(65) Prior Publication Data

US 2025/0225129 A1     Jul. 10, 2025

(51) Int. Cl.
*G10L 15/22* (2006.01)
*G06F 16/2452* (2019.01)
(Continued)

(52) U.S. Cl.
CPC .. *G06F 16/24522* (2019.01); *G06F 16/24552* (2019.01); *G10L 15/18* (2013.01);
(Continued)

(58) Field of Classification Search
None
See application file for complete search history.

(56) References Cited

U.S. PATENT DOCUMENTS 6,651,072 B1    11/2003   Carino, Jr. et al.
9,049,117 B1    6/2015    Nucci et al.
(Continued)

FOREIGN PATENT DOCUMENTS

WO        9909494 A1    2/1999

OTHER PUBLICATIONS

U.S. Appl. No. 18/209,844, Non-Final Office Action, mailed on Jun. 24, 2025, 18 pages.
(Continued)

*Primary Examiner* — Richard Z Zhu
(74) *Attorney, Agent, or Firm* — Kilpatrick Townsend & Stockton LLP

(57)        ABSTRACT

Techniques for natural language processing include accessing an input string comprising a natural language utterance and a database schema representation for a database; providing the natural language utterance to a first encoder to generate one or more embeddings of the natural language utterance; providing the database schema representation to the first encoder to generate one or more embeddings of the database schema representation; encoding, by a second encoder, relations between elements in the database schema representation and words in the natural language utterance based on the one or more embeddings of the natural language utterance and the one or more embeddings of the database schema representation; and generating a logical form for the natural language utterance based on the encoded relations, the one or more embeddings of the natural language utterance, and the one or more embeddings of the database schema representation.

17 Claims, 13 Drawing Sheets

(51) Int. Cl.

| | |
|---|---|
| *G06F 16/2455* | (2019.01) |
| *G10L 15/18* | (2013.01) |
| *G06F 16/28* | (2019.01) |
| *G06F 40/30* | (2020.01) |
| *G06N 3/0455* | (2023.01) |

(52) U.S. Cl.
CPC ...... *G10L 15/1815* (2013.01); *G10L 15/1822* (2013.01); *G06F 16/24526* (2019.01); *G06F 16/24528* (2019.01); *G06F 16/284* (2019.01); *G06F 40/30* (2020.01); *G06N 3/0455* (2023.01); *G10L 15/22* (2013.01)

(56) References Cited

U.S. PATENT DOCUMENTS

| | | | |
|---|---|---|---|
| 9,448,995 | B2 | 9/2016 | Kurz |
| 10,073,840 | B2 * | 9/2018 | Hakkani-Tur .......... G06F 40/40 |
| 10,872,083 | B2 * | 12/2020 | Lin ....................... G06F 16/284 |
| 11,409,738 | B2 | 8/2022 | Teja et al. |
| 11,429,607 | B2 | 8/2022 | Anand et al. |
| 11,551,159 | B2 * | 1/2023 | Rastogi ................... G06N 20/00 |
| 11,561,969 | B2 * | 1/2023 | Kim .................. G06F 16/90332 |
| 11,868,344 | B1 * | 1/2024 | Song ..................... G06F 40/263 |
| 11,868,727 | B2 * | 1/2024 | Vu ........................ G06F 40/205 |
| 11,954,102 | B1 * | 4/2024 | Palaniappan ....... G06F 16/2237 |
| 12,013,850 | B2 * | 6/2024 | Rahmfeld ............. G06F 16/213 |
| 2015/0178273 | A1 * | 6/2015 | Hakkani-Tur .......... G06F 40/40 704/9 |
| 2017/0139984 | A1 * | 5/2017 | Bordawekar ........... G06N 5/02 |
| 2018/0137863 | A1 | 5/2018 | Nagao et al. |
| 2020/0134032 | A1 * | 4/2020 | Lin .................... G06F 16/2456 |
| 2020/0394478 | A1 | 12/2020 | Malak et al. |
| 2021/0303555 | A1 * | 9/2021 | Kim .................. G06F 16/90332 |
| 2022/0229993 | A1 * | 7/2022 | Vu ................... G06V 30/19147 |
| 2022/0245134 | A1 | 8/2022 | Aalipour Hafshejani et al. |
| 2022/0318316 | A1 * | 10/2022 | Haldar .................... G06N 3/091 |
| 2023/0009946 | A1 * | 1/2023 | Rossiello .............. G06F 40/216 |
| 2023/0169075 | A1 * | 6/2023 | Han ...................... G06F 16/243 707/769 |
| 2023/0186025 | A1 | 6/2023 | John et al. |

OTHER PUBLICATIONS

Chen et al., "A Tale of Two Linkings: Dynamically Gating between Schema Linking and Structural Linking for Text-to-SQL Parsing", mailed Nov. 22, 2020, 13 pages.

Guo et al., "Towards Complex Text-to-SQL in Cross-Domain Database with Intermediate Representation", Proceedings of the 57th Annual Meeting of the Association for Computational Linguistics, Jul. 28-Aug. 2, 2019, pp. 4524-4535.

"Answering Business Questions with Amazonquicksight Q", Available online at: https://docs.aws.amazon.com/quicksight/latest/user/working-with-quicksight-q.html, 2023, 2 pages "Querying Your Data with Simply Ask (NLQ)", Available Online at: https://docs.sisense.com/main/SisenseLinux/simply-ask-query-in-natural-language.htm#:~: text=Simply%20Ask%20is%20Sisense's%20Natural,provide%20you%20with%20the%20answers., Nov. 10, 2022, 18 pages.

"Spider 1.0 Yale Semantic Parsing and Text-to-SQL Challenge", Available online at: https://yale-lily.github.io/spider, Dec. 7, 2023, pp. 1-20.

"What is Amazon QuickSight?", Available online at: https://docs.aws.amazon.com/quicksight/latest/user/welcome.html, 2023, 3 pages.

Cheng et al., "Learning Structured Natural Language Representations for Semantic Parsing", Proceedings of the 55th Annual Meeting of the Association for Computational Linguistics, Association for Computational Linguistics, Jul. 30-Aug. 4, 2017, pp. 44-55.

Dayananda , "Joining Across Data Sources on Amazon Quicksight", Amazon QuickSight, Analytics, AWS Big Data, Nov. 1, 2019, 11 pages.

Desai et al., "Calibration of Pre-Trained Transformers", Proceedings of the 2020 Conference on Empirical Methods in Natural Language Processing, Nov. 16-20, 2020, pp. 295-302.

Guo et al., "On Calibration of Modern Neural Networks", Proceedings of the 34th International Conference on Machine Learning, vol. 70, Aug. 3, 2017, 14 pages.

He et al., "DeBERTaV3: Improving DeBERTa Using Electra-Style Pre-Training with Gradient-Disentangled Embedding Sharing", Available Online at: https://arxiv.org/pdf/2111.09543.pdf, Mar. 24, 2023, 16 pages.

Kingma et al., "ADAM: A Method For Stochastic Optimization", International Conference on Learning Representations, Conference paper at ICLR 2015, Jan. 30, 2017, 15 pages.

Liu et al., "RoBERTa: A Robustly Optimized BERT Pretraining Approach", Available Online at: https://arxiv.org/abs/1907.11692, Jul. 26, 2019, 13 pages.

Montgomery et al., "Towards a Natural Language Query Processing System", 1st International Conference on Big Data Analytics and Practices (IBDAP), arXiv:2009.12414, dated Sep. 2020, 6 pages.

Nassiri et al., "An Intermediate Representation-based Approach for Query Translation using a Syntax-Directed Method", (IJACSA) International Journal of Advanced Computer Science and Applications, vol. 11, Nov. 8, 2020, 7 pages.

Nie et al., "GraphQ IR: Unifying the Semantic Parsing of Graph Query Languages with One Intermediate Representation", Computer Science, ArXiv, Nov. 7, 2022, 18 pages.

PCT/US2023/072540 , "International Search Report and the Written Opinion", Dec. 7, 2023, 9 pages.

Rubin et al., "SmBoP: Semi-Autoregressive Bottom-Up Semantic Parsing", Available Online at: https://arxiv.org/pdf/2010.12412.pdf, Apr. 11, 2021, 14 pages.

Saha et al., "ATHENA: An Ontology-Driven System for Natural Language Querying over Relational Data Stores", Proceedings of the VLDB Endowment, vol. 9, No. 12, Aug. 1, 2016, pp. 1209-1220.

Sun et al., "A Survey of Pretrained Language Models", Knowledge Science, Engineering and Management: 15th International Conference, KSEM 2022, Aug. 6-8, 2022, pp. 442-456.

Wang et al., "RAT-SQL: Relation-Aware Schema Encoding and Linking for Text-to-SQL Parsers", Available Online at: https://arxiv.org/pdf/1911.04942.pdf, Aug. 24, 2021, 12 pages.

Yu et al., "GraPPa: Grammar-Augmented Pre-Training for Table Semantic Parsing", Available online At: https://arxiv.org/pdf/2009.13845.pdf, May 29, 2021, 16 pages.

U.S. Appl. No. 18/209,844, Final Office Action, mailed on Nov. 18, 2025, 20 pages.

Deshpande et al., "Querylizer: An Interactive Platform for Database Design and Text to SQL Conversion", Institute of Electrical and Electronics Engineers, Jan. 2022,.

Devlin et al., "BERT: Pre-training of Deep Bidirectional Transformers for Language Understanding", Available online At: https://arxiv.org/abs/1810.04805, May 24, 2019, 16 pages.

Yin et al., "A Syntactic Neural Model for General-Purpose Code Generation", Proceedings of the 55th Annual Meeting of the Association for Computational Linguistics, vol. 1, Apr. 6, 2017, 14 pages.

U.S. Appl. No. 18/209,844, Non-Final Office Action, mailed on Mar. 9, 2026, 21 pages.

* cited by examiner

400

600

622 — Output

620 — Decoder

618 — Input Tokens Embeddings

616 — Embedding Integrator

610 — Encoder Component

612 — User Utterance Embeddings

+

614 — Fixed Portion Embeddings

606 — User Utterance Embedder

608 — Fixed Portion Embedder

602 — User Utterance

604 — Fixed Portion

900

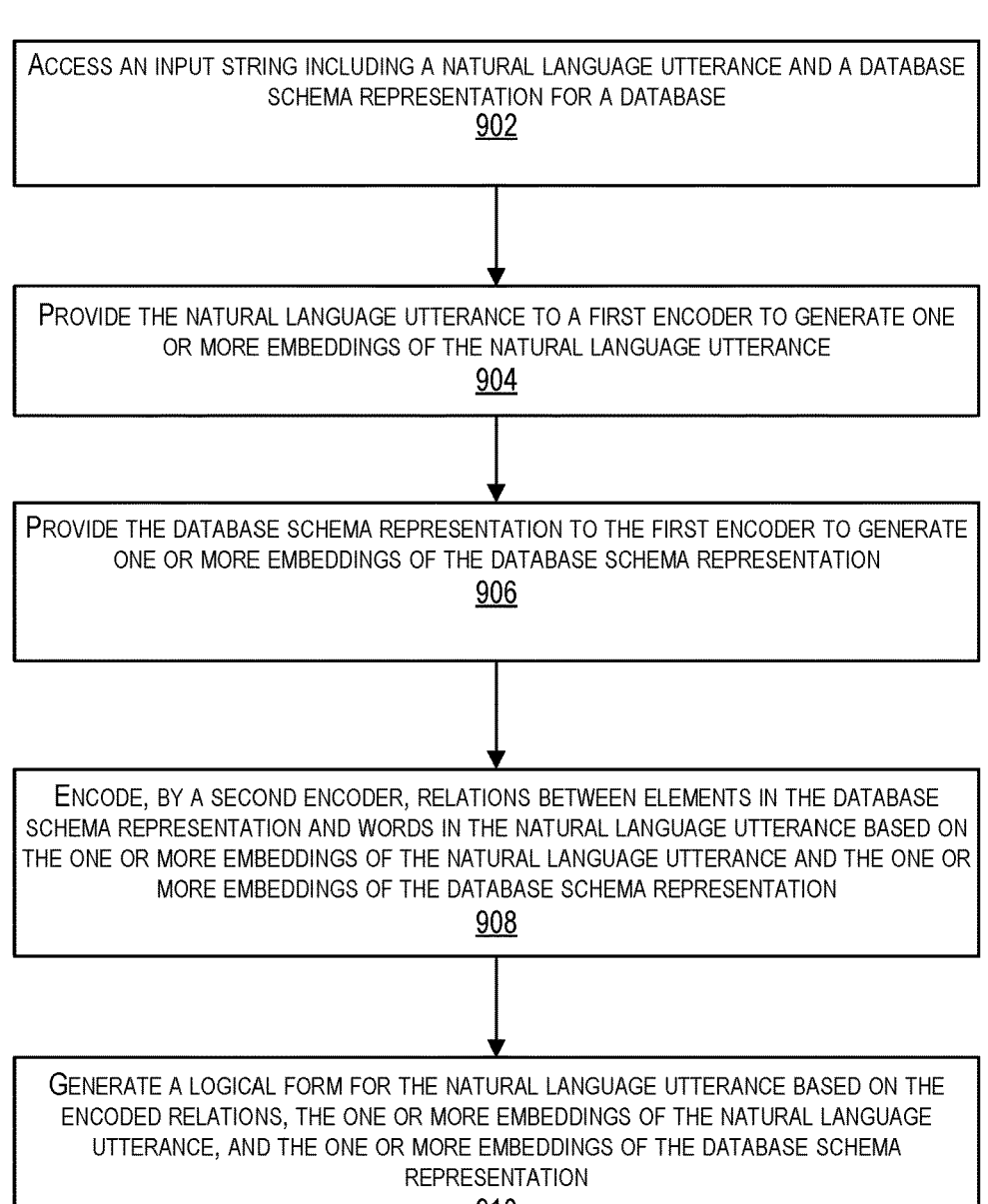

ACCESS AN INPUT STRING INCLUDING A NATURAL LANGUAGE UTTERANCE AND A DATABASE SCHEMA REPRESENTATION FOR A DATABASE
902

PROVIDE THE NATURAL LANGUAGE UTTERANCE TO A FIRST ENCODER TO GENERATE ONE OR MORE EMBEDDINGS OF THE NATURAL LANGUAGE UTTERANCE
904

PROVIDE THE DATABASE SCHEMA REPRESENTATION TO THE FIRST ENCODER TO GENERATE ONE OR MORE EMBEDDINGS OF THE DATABASE SCHEMA REPRESENTATION
906

ENCODE, BY A SECOND ENCODER, RELATIONS BETWEEN ELEMENTS IN THE DATABASE SCHEMA REPRESENTATION AND WORDS IN THE NATURAL LANGUAGE UTTERANCE BASED ON THE ONE OR MORE EMBEDDINGS OF THE NATURAL LANGUAGE UTTERANCE AND THE ONE OR MORE EMBEDDINGS OF THE DATABASE SCHEMA REPRESENTATION
908

GENERATE A LOGICAL FORM FOR THE NATURAL LANGUAGE UTTERANCE BASED ON THE ENCODED RELATIONS, THE ONE OR MORE EMBEDDINGS OF THE NATURAL LANGUAGE UTTERANCE, AND THE ONE OR MORE EMBEDDINGS OF THE DATABASE SCHEMA REPRESENTATION
910

*FIG. 9*

TECHNIQUES FOR EFFICIENT ENCODING IN NEURAL SEMANTIC PARSING SYSTEMS

BACKGROUND

Artificial intelligence has many applications. To illustrate, many users around the world are on instant messaging or chat platforms in order to get instant reactions. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

Artificial intelligence-based solutions, such as chatbots, may have both analog (human) and digital (machine) interfaces for interacting with a human and connecting to a backend system. It is advantageous to be able to extract and analyze the meaning of an utterance (e.g., a request) when a human makes one using natural language, independent of how a backend system will handle the utterance. As an example, a request might be for data that needs to be retrieved from a relational database, or the requested data might need to be extracted from a knowledge graph. A meaning representation language (MRL) is a versatile representation of a natural language utterance that a chatbot can translate into any number of target machine-oriented languages. As such, an MRL can be utilized by a chatbot to communicate interchangeably with both a human and various backend systems, including systems that communicate using Structured Query Language (SQL), Application Programming Interfaces (APIs), REpresentational State Transfer (REST), Graph Query Language (GraphQL), Property Graph Query Language (PGQL), etc.

Such natural language models commonly employ encoders and decoders to process information. The encoding process is more time-consuming and compute-intensive the larger the input. Some models are configured to convert a natural language utterance to a logical form such as a database query representation. Such models often require large input. For example, for a particular semantic parser that converts natural language to a database query, the encoder input concatenates the database schema as well as the user's utterance into a long sequence and then feeds it into the model. The encoder latency at run-time is at least proportional to the encoder input length. Thus, certain natural language processing models suffer from computational inefficiencies.

BRIEF SUMMARY

Machine-learning techniques are provided (e.g., a method, a system, non-transitory computer-readable medium storing code or instructions executable by one or more processors) for separately encoding a natural language utterance and database schema representation which provides more efficient encoding while preserving accuracy.

In various embodiments, a computer-implemented method is provided that includes accessing an input string comprising a natural language utterance and a database schema representation for a database; providing the natural language utterance to a first encoder to generate one or more embeddings of the natural language utterance; providing the database schema representation to the first encoder to generate one or more embeddings of the database schema representation; encoding, by a second encoder, relations between elements in the database schema representation and words in the natural language utterance based on the one or more embeddings of the natural language utterance and the one or more embeddings of the database schema representation; and generating a logical form for the natural language utterance based on the encoded relations, the one or more embeddings of the natural language utterance, and the one or more embeddings of the database schema representation.

In some aspects, the input string is a first input string and the natural language utterance is a first natural language utterance, the method further comprising: storing the one or more embeddings of the database schema representation to a cache; accessing a second input string comprising a second natural language utterance and the database schema representation; providing the second natural language utterance to the first encoder to generate one or more embeddings of the second natural language utterance; retrieving the one or more embeddings of the database schema representation from the cache; encoding, by the second encoder, relations between elements in the database schema representation and words in the second natural language utterance based on the one or more embeddings of the second natural language utterance and the one or more embeddings of the database schema representation; and generating a logical form for the second natural language utterance based on the encoded relations, the one or more embeddings of the second natural language utterance, and the one or more embeddings of the database schema representation. In some aspects, the cache comprises a local cache.

In some aspects, the first encoder comprises a plurality of layers, and providing the natural language utterance to the first encoder to generate one or more embeddings of the natural language utterance comprises providing the natural language utterance to a first subset of the layers of the first encoder to generate one or more utterance embeddings; providing the database schema representation to the first encoder to generate one or more embeddings of the database schema representation comprises providing the database schema representation to the first subset of the layers of the first encoder to generate one or more schema embeddings; the method further comprising: concatenating the one or more utterance embeddings and the one or more schema embeddings to generate one or more concatenated embeddings; and providing the one or more concatenated embeddings to a second subset of the layers of the first encoder to generate the one or more embeddings of the natural language utterance and the one or more embeddings of the database schema representation.

In some aspects, the first encoder comprises N layers; the first subset of the layers comprises K layers, wherein K is a configurable integer less than N; and the second subset of the layers comprises N-K layers.

In some aspects, the input string further comprises one or more tokens, and the method further comprises: providing the one or more tokens to the first encoder to generate one or more embeddings of the one or more tokens; and caching the one or more embeddings of the one or more tokens.

In some aspects, the first encoder is a Pre-trained Language Model (PLM); and the second encoder is a Relation-Aware Transformer (RAT).

In various embodiments, a system is provided that includes one or more processors and one or more computer-readable media storing instructions which, when executed by the one or more processors, cause the system to perform part or all of the operations and/or methods disclosed herein.

In various embodiments, one or more non-transitory computer-readable media are provided for storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 9 illustrates a flowchart illustrating a process for efficient encoding in accordance with various embodiments.

DETAILED DESCRIPTION

Figure 1:
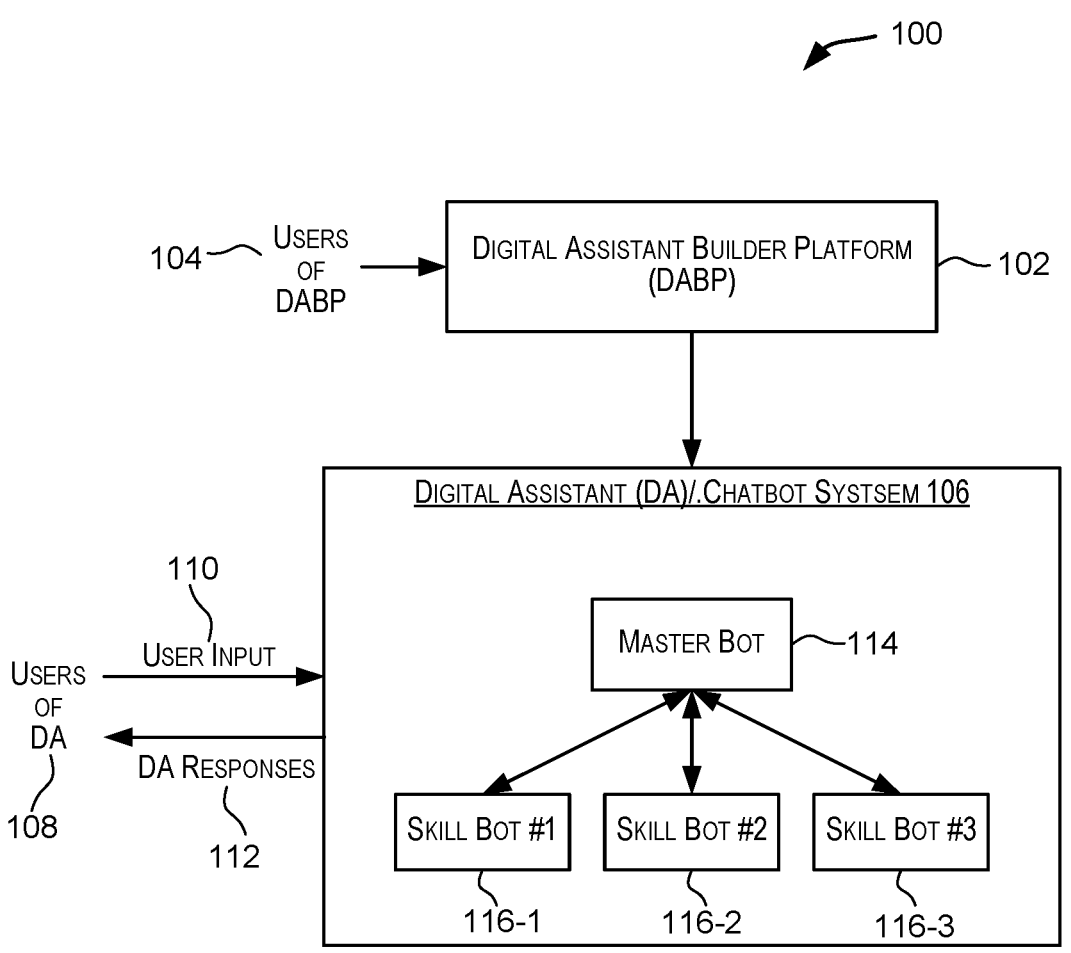
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

Machine learning models such as large language models are increasingly popular, used to perform tasks such as answering complex questions. Such models require a great deal of data for training and evaluation. For example, the Conversation to Oracle Meaning Representation Language (C2OMRL) system is a neural-based machine learning system that converts a natural language utterance to a logical form such as a database query representation. An encoder-decoder architecture is used to encode both the natural language utterance and a schema representation (e.g., for the database to be queried). The database schema representation is large and time-consuming to encode.

Accordingly, different approaches are needed to address these challenges and others. The approaches described herein separately encode the natural language utterance and the database schema representation. The encoded database schema representation can then be cached, and retrieved without repeating the encoding process. This can provide a substantial speed-up for the inference process (e.g., a 50+% reduction in time), also greatly reducing the amount of computational resources needed at run time.

As used herein, when an action is "based on" something, this means the action is based at least in part on at least a part of the something. As used herein, the terms "similarly", "substantially", "approximately" and "about" are defined as being largely but not necessarily wholly what is specified (and include wholly what is specified) as understood by one of ordinary skill in the art. In any disclosed embodiment, the term "similarly", "substantially", "approximately," or "about" may be substituted with "within [a percentage] of" what is specified, where the percentage includes 0.1, 1, 5, and 10 percent.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can be communicated by various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot
Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request. In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot-A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section (b) a default transitions section (c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
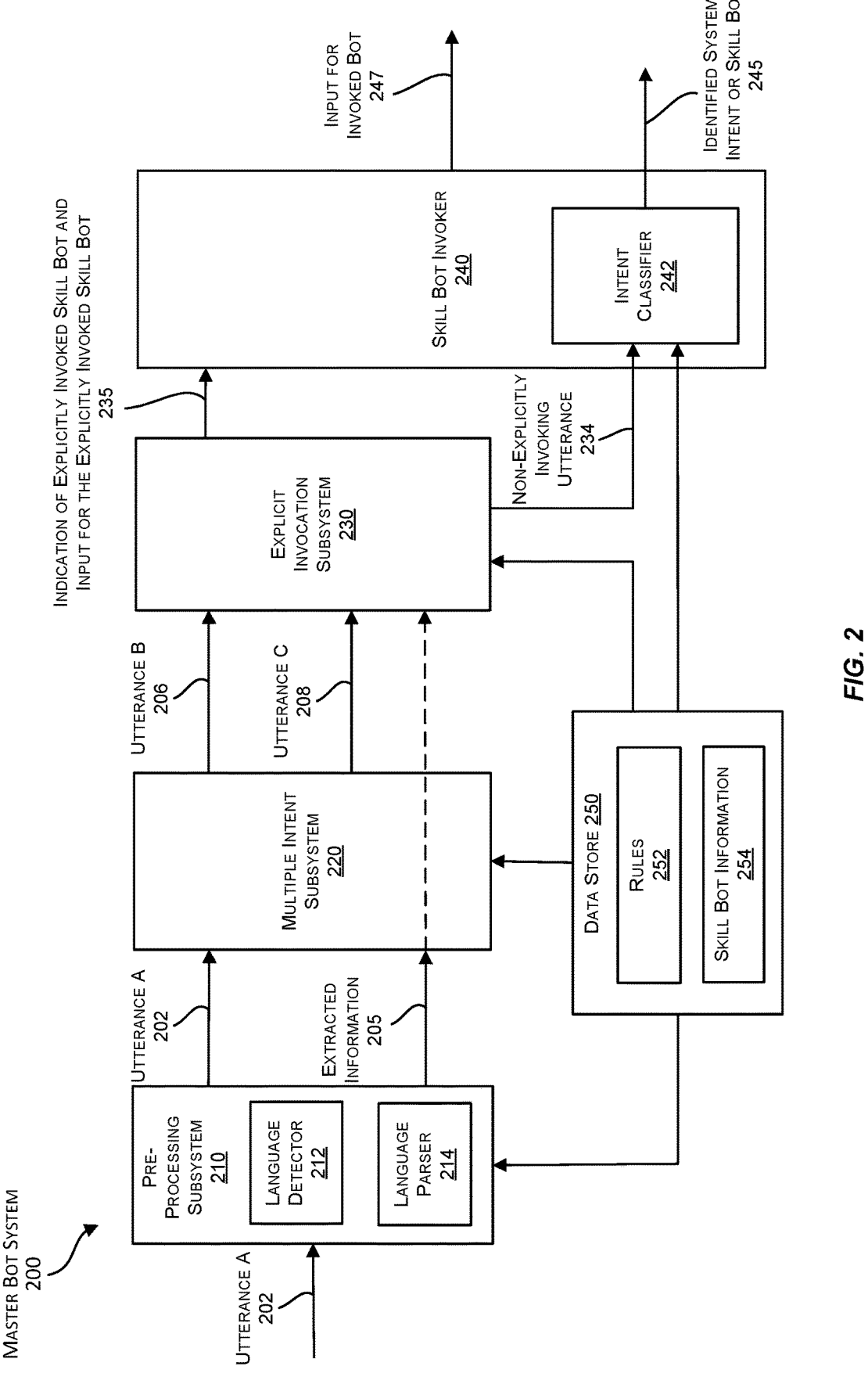
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit_card." Language parser 214 may also identify relationships between the words in the utterance 202. For example, in some embodiments, the language parser 214 generates a dependency tree that indicates which part of the utterance (e.g., a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
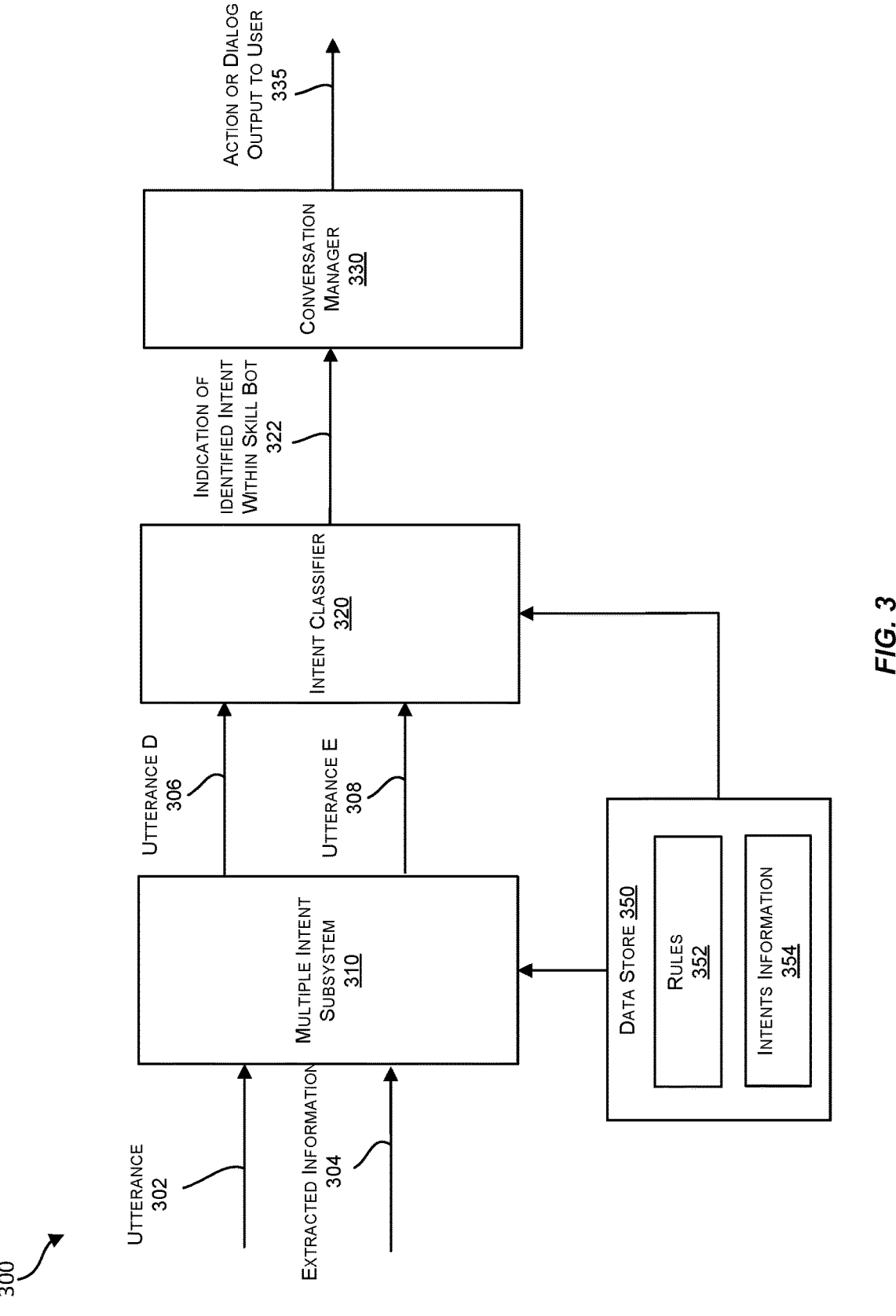
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot), or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g., "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Converting a Natural Language Utterance to an Intermediate Database Query Language In some aspects, the model is trained to generate, based on a natural language utterance, a logical form that is an intermediate database query representation. This intermediate database query representation can then be translated into a suitable database query language such as SQL, PGQL, etc. In some instances, the intermediate database representation is in a language called Oracle Meaning Representation Language (OMRL), and a Conversation to Oracle Meaning Representation Language (C2OMRL) system performs the conversion of the natural language utterance to the logical form. The C2OMRL system is powered by a deep learning model configured to convert a natural language (NL) utterance (or a conversation within the Oracle Digital Assistant platform) into a logical form in an intermediate database query language such as OMRL. The logical form can be used to generate a query in a specific database query language, which can then be executed for querying an existing database. This deep learning model (referred to as a "C2OMRL semantic parser" or "C2OMRL model") is trained with thousands of example pairs (natural language to logical form).

Figure 4:
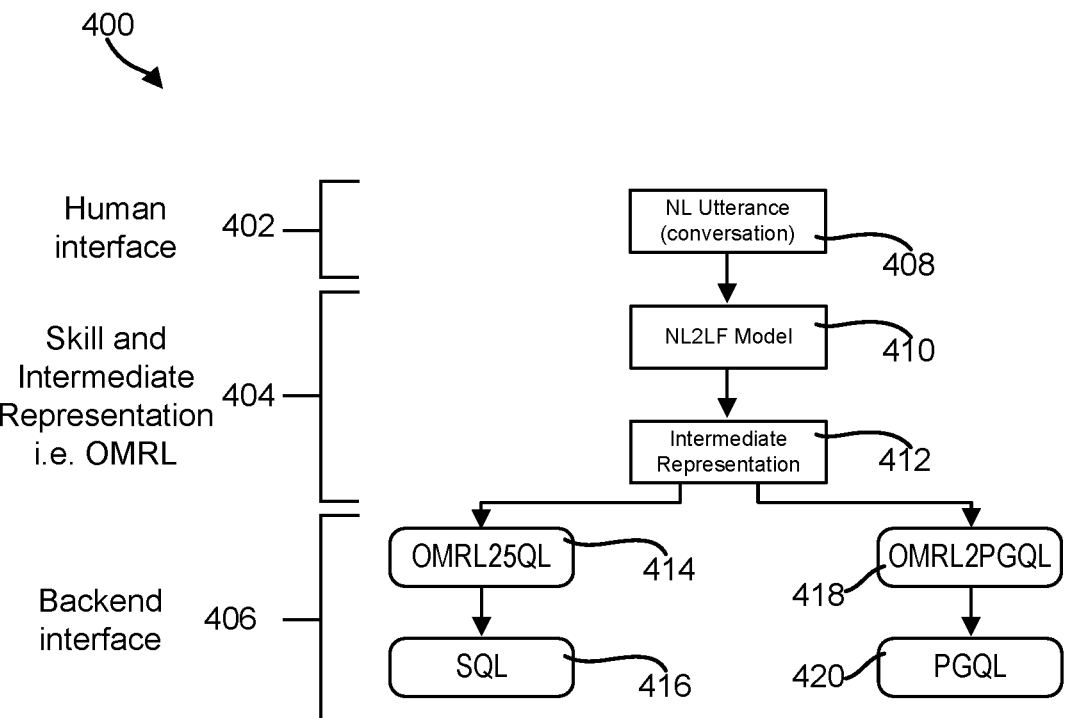
FIG. 4 is a block diagram illustrating an overview of an architecture and process for generating a query for a back-end interface starting with a natural language utterance, in accordance with various embodiments.

FIG. 4 is a block diagram 400 illustrating an overview of the C2OMRL architecture with an overview of a process for generating a query for a backend interface 406 starting with a natural language (NL) utterance 408, e.g., as received via a human interface 402. For example, the human interface 402 can be a chatbot system that receives spoken speech and translates it to a text utterance, as described above, or a system where a user types in a request in natural language, or other suitable interfaces. The NL utterance 408 can be in the form of part of a conversation (e.g., "Hello, can you tell me how many orders we need to send out tomorrow?" or "Search for all employees with first name starting with 'S' and living in California.").

The NL utterance 408 is provided to a NL2LF model 410, which converts the NL utterance 408 to an intermediate representation 412. The NL2LF model 410 is a machine learning model trained to generate intermediate representations 412 from NL utterances 408. The NL2LF model 410 can include multiple layers.

In some instances, as depicted in FIG. 4, the NL2LF model 410 is Conversation to Oracle Meaning Representation Language (C2OMRL) model for converting a conversational utterance to an intermediate Oracle Meaning Representation Language (OMRL) representation 412. The NL2LF model 410 may be described interchangeably herein with C2OMRL, although it should be understood that the techniques described herein can be applied to models configured to generate other intermediate representation 412 formats.

The intermediate representation 412 is a logical representation of the utterance, which is configured to be translatable into a specific database query language. In some examples, the intermediate representation 412 is in Oracle Meaning Representation Language (OMRL), an intermediate database query language with a specialized schema and interface specification as described herein. The intermediate representation 412 may be described interchangeably herein with OMRL, although it should be understood that the techniques described herein can be applied to other intermediate representation 412 formats.

The intermediate representation 412 can then be translated to one or more desired query formats, such as SQL 416 using an OMRL2SQL 414 translation process, or to PGQL 420 using an OMRL2PGQL 418 translation process. The translated query (e.g., SQL 416 or PGQL 420) represents the concepts that are present in intermediate representation 412 in a manner that conforms to the requirements of the applicable query language. As described above, the process of generating a model to generate a backend interface 406 facing query (e.g., SQL 416 or PGQL 420) is time-consuming and involves processing massive amounts of data. In comparison, the OMRL2SQL 414, OMRL2PGQL 418, and similar frameworks for translation from the intermediate representation 412 to a query in a language such as SQL 416, PGQL 420, etc. are relatively quick to build and execute. Since such translations are initiated from an intermediate representation that is configured to be translated into a database query language, the models for performing the translations 414, 418 do not need to be trained on large corpuses of natural language training samples. Thus, the architecture and techniques described herein can significantly reduce training times for generating a platform for translating natural language utterances into in multiple query languages.

Figure 5:
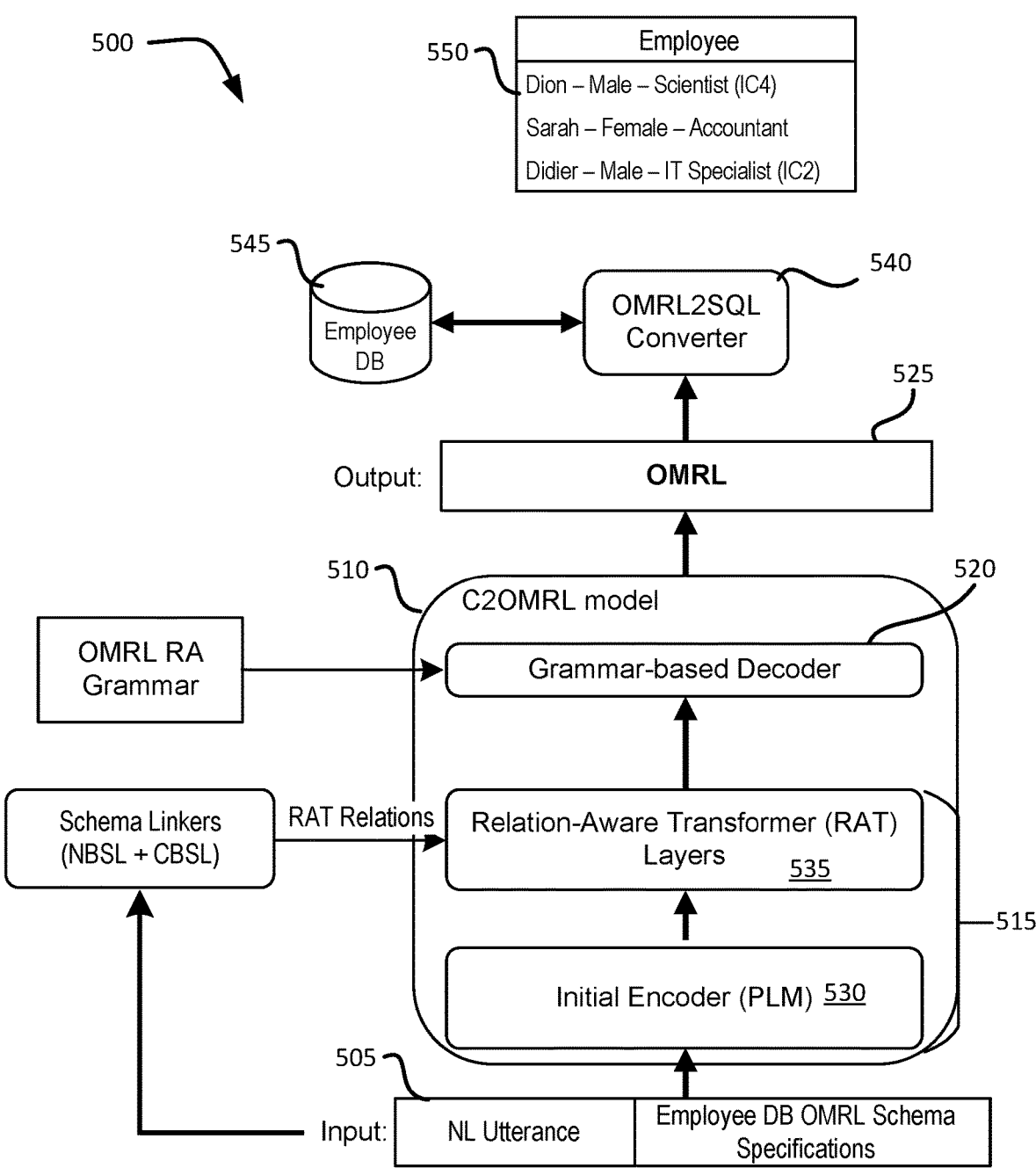
FIG. 5 is a simplified block diagram of the architecture for generating a query for a backend interface starting with a natural language utterance in accordance with various embodiments.

Overview of System for Translating Natural Language to Meaning Representation Language FIG. 5 shows a C2OMRL system 500 powered by a machine learning model to be able to convert a natural language (NL) utterance (e.g., an utterance within the Digital Assistant platform as described with respect to FIGS. 1-3) into a logical form (LF) statement such as OMRL query or command, which in turn can be executed for querying an existing system such as a relational database. This machine learning model (referred to herein as the "C2OMRL semantic parser" or "C2OMRL model") is trained on hundreds to thousands of annotated example pairs (natural language and logical form pairs) for translating a natural language utterance into a logical form statement. The example shown in FIG. 5 illustrates the C2OMRL system without the specialized embedding process of FIGS. 6-10.

As shown, an example 505 is input into the C2OMRL model 510. The example 505 is the concatenation of a natural language utterance and a database schema. The database schema is, e.g., a sequence of table and column names. Alternatively or additionally, the example 505 includes extra tokens. For example, an extra token is provided to specify a construct used in the database schema corresponding to part of the input utterance. As a specific example, for the utterance "show me female employees in New York," the query specifies the condition sex-F. The system understands female as "F," which corresponds to a column in the database. The extra token specifies this condition in a format corresponding to the database schema. In some instances, the input to the model is formed by concatenating three strings: (User Utterance) <s> (Extra Tokens) <s> (Database Schema). As a specific example, the example 505 may include an input utterance, "List the total number of horses on farms in ascending order," and a schema from Spider data. (See Spider Yale Semantic Parsing and Text-to-SQL Challenge, https://yale-lily.github.io/spider, accessed on Dec. 7, 2023). In some cases, the utterance is tokenized using a pretrained tokenizer such as ROBERTa (Robustly Optimized BERT Pretraining Approach). (See Liu et al, "ROBERTa: A Robustly Optimized BERT Pretraining Approach," arXiv:1907.11692 (2019)). In this example, the example 505 may be:

<s> List Gthe Gtotal Gnumber Gof Ghorses Gon Gfarms Gin Gascending Gorder. </s>1 2 3 4 5 yes no y nt f m null * city (city. area km 2: number, city. census ranking: text, city. city id: number, city. official name: text, city. population: number, city. status: text)

competition record (competition record. competition id: number, competition record. farm id: number, competition record . . . .

</s>.

The example 505 is first processed by the encoder component 515, which captures the representation of the natural language utterance and the database schema contextually. The decoder 520 then receives the encoded input and predicts the logical form 525 (e.g., OMRL, which is a SQL-like query) based on the captured representation of the natural language utterance and the database schema.

In the C2OMRL model 510, the encoder component 515 includes two encoders (1) a Pre-trained Language Model (PLM) 530; and a Relation-Aware Transformer (RAT) 535. In some aspects, the PLM 530 is a multi-layer transformer model with self-attention, which computes an embedding for every token in the encoder's input. The self-attention mechanism enables complex dependencies between input tokens. The PLM 530 is used to embed the natural language utterance and database schema, as it captures a representation of the natural language utterance and the database schema contextually. In certain instances, a transformer-based PLM called Decoding-enhanced BERT with disentangled attention (DeBERTa) is used as the PLM 530. (See He et al., DeBERTaV3: Improving DeBERTa using ELECTRA-Style Pre-Training with Gradient-Disentangled Embedding Sharing (2021)). Transformer-based PLMs learn universal language representations from large volumes of text data using self-supervised learning and transfer this knowledge to downstream tasks. These models provide good background knowledge to downstream tasks which avoids training of downstream models from scratch. The RAT 535 encodes the relations between so-called entities (words of tables and columns) in the database schema and words in the natural language utterance (these relations are called "schema linking" relations). In the case of semantic parsing, the RAT 535 is designed to encourage complex dependencies between tokens in the User Utterance and the Fixed Suffix (which encodes the Database Schema and other extra tokens).

The decoder 520 is based on a bottom-up generative process (i.e., the bottom-up generative process generates a tree from a bottom (leaf nodes) up to the top (root node)), where the final generation output is a OMRL tree (i.e., a tree-based structure that represents the full OMRL logical form) that can be reconstructed to an OMRL logical form 525 output. The bottom-up generative process is implemented using a beam search, which is a heuristic search algorithm that explores a graph by expanding the most promising node in a limited set. The beam search works in steps (e.g., ~10 steps), also called "beam levels". At each step (e.g., "step i"), the beam search algorithm generates a number F of possible sub-trees for an input sequence that can be obtained by extending the current sub-trees (from step "i-1"), and then selects the top-K sub-trees (known as beam width) for retention using the conditional probability associated with each sub-tree. The conditional probability is referred to herein as a "raw beam score", and thus the top-K intermediate results (to be considered in the next generative step) are the K ones with the highest raw beam scores. Additional information for the bottom-up generative process is found in "Ohad Rubin and Jonathan Berant. 2021. SmBoP: Semi-autoregressive Bottom-up Semantic Parsing. In Proceedings of the 2021 Conference of the North American Chapter of the Association for Computational Linguistics: Human Language Technologies, pages 311-324, Online. Association for Computational Linguistics," the entire contents of which are hereby incorporated by reference full all purposes. The final decoder 520 output is the sub-tree with the highest raw beam score at the last step N.

The predicted OMRL logical form statement 525 (i.e., the OMRL tree with the highest raw beam score at the last step N) can then be input into a language converter 540 such as (OMRL2SQL) to translate the meaning representation language to a systems language query or command such as SQL, APIs, REST, GraphQL, PGQL, etc. The systems language query or command can then be used to query or execute an operation on a system 545 (e.g., a relational database) and obtain an output 550 as a result of the query or command.

Techniques for Efficient Embedding

As described above, in some examples, the C2OMRL system uses a deep-learning model to convert a NL (Natural Language) utterance into a common logical form called Oracle Meaning Representation Language (OMRL) which then is translated into a specific database query (e.g., SQL via an OMRL to SQL backend). The generated query can be executed against a database to return the list of database rows back to the user. The deep learning (aka ML backend model) (referred to as the "semantic parser," "C2OMRL semantic parser," or "C2OMRL model") is trained with general domain datasets in the order of thousands of examples.

In some instances, the C2OMRL semantic parsers are slow because the encoder input concatenates the database schema as well as the user's utterance into a long sequence and then feeds it into a pretrained language model (PLM). The encoder latency at run-time is at least proportional to (often quadratic in) the encoder input length (at least on CPUs). Since the database schema can easily be 10 times longer than the user utterance, most of the encoder's time is spent parsing the database schema, not the user utterance. The DB schema is unchanged across different NL questions, and therefore it is not necessary to do concatenation every time a new NL question is obtained.

In some aspects, the DB schema encoding is cached, providing a massive speed-up for the inference process (e.g., a 50+% reduction). Like all caching systems, the performance benefits depend on how the cost of retrieving information from the cache compares to the cost of computing that information from scratch. Efficient encoding is provided using Efficient Encoder Embedding Caching (EEC) architectures for parsing the database schema ahead of time, which facilitates caching the schema representation. At run-time, only the (much shorter) user utterance is processed while the entire database schema is cached. In some aspects, a schema encoder encodes each entity (aka table) and attribute (aka column) in an OMRL Schema with a single "soft token" representation.

Figure 6:
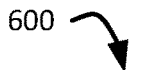
FIG. 6 is a schematic overview of a process for efficient embedding using a cache in accordance with various embodiments.

FIG. 6 illustrates a schematic overview of a process 600 for efficient embedding using a cache in accordance with various embodiments. The embedding process is performed using a system including an encoder component 610 that generates input tokens embeddings 618 and a decoder 620 that generates output 622.

As shown in FIG. 6, the input to the encoder component 610 includes a user utterance 602 and a fixed portion 604. In some instances, the fixed portion 604 includes a fixed prefix and/or a fixed suffix. The fixed portion 604 may include the database schema and/or extra tokens as described above with respect to FIG. 5. In some aspects, the database schema and extra tokens are fixed and unchanging (e.g., once a database has been selected). The model input includes the fixed portion 604 that does not change and a user utterance 602 that will vary.

The encoding techniques described herein separately embed the fixed portion 604 to generate fixed portion embeddings 614. These fixed portion embeddings 614 can then be cached so that the fixed portion embeddings 614 do not have to be recomputed for each user utterance in runtime. This saves a great deal of compute power and time, particularly in cases in which there is a long database schema involved.

The encoder component 610 includes a user utterance embedder 606 and a fixed portion embedder 608. The fixed portion embedder 608 and the user utterance embedder 606 calculate embeddings of the fixed portion 604 and the user utterance 602 independently. The user utterance embedder 606 generates user utterance embeddings 612 based on the user utterance 602. The fixed portion embedder 608 generates fixed suffix embeddings 614 based on the fixed portion 604. The fixed portion embeddings 614 do not depend on the user utterance 602, so the fixed portion embeddings can be cached.

In some aspects, the encoder component 610 further includes an embedding integrator 616. The embedding integrator 616 combines the user utterance embeddings 612 and the fixed portion embeddings 614 to produce the input tokens embeddings 618.

In some aspects, the decoder 620 processes the input tokens embeddings 618 to generate output 622. As described above with respect to FIG. 5, the output in some examples is a logical form of the user utterance. In a specific example, the output 622 is an OMRL query-like string that corresponds to the input user utterance 602.

Various kinds of neural network models may be used in the fixed portion embedder 608, the user utterance embedder 606, and the embedding integrator 616. In some implementations, a transformer model is used for each of these components. In some aspects, the transformer includes attention layers, and the attention connections in the lower transformer layers between the fixed portion 604 and the user utterance 602 are obtained.

With RAT-based semantic parsers, the fixed portion embedder 608 and the user utterance embedder 606 use RAT relations that hold between tokens in their input. RAT relations, e.g., between the database components (entities and attributes) and the user utterance, would be ignored by these embedders. The embedding integrator 616 could use all the RAT relations because it encompasses all the tokens in the fixed portion 604 and the user utterance 602.

The fixed portion embedder 608 and the user utterance embedder 606 may or may not share the same architecture. In some instances, the user utterance embedder 606 and the fixed portion embedder 608 are implemented in the same encoder. Alternatively, in some instances different models are trained for the fixed portion embedder 608 and the user utterance embedder 606. Training different models for the fixed portion embedder 608 and the user utterance embedder 606 can improve accuracy, particularly if the fixed portion 604 is very different from the user utterance 602 (as it is in semantic parsing, where the fixed portion 604 contains a database schema).

Using an architecture as depicted in FIG. 5, in some implementations, the user utterance embedder 606 and the fixed portion embedder 608 correspond to the PLM 530, and the embedding integrator 616 corresponds to the RAT 535.

In some instances, the fixed portion embeddings 614 are cached. This saves computation, particularly in the case that the embedding integrator 616 is considerably smaller than the fixed portion embedder 608. For example, the embedding integrator 616 has one or two transformer layers and the fixed portion embedder 608 has twelve attention layers.

Figure 7:
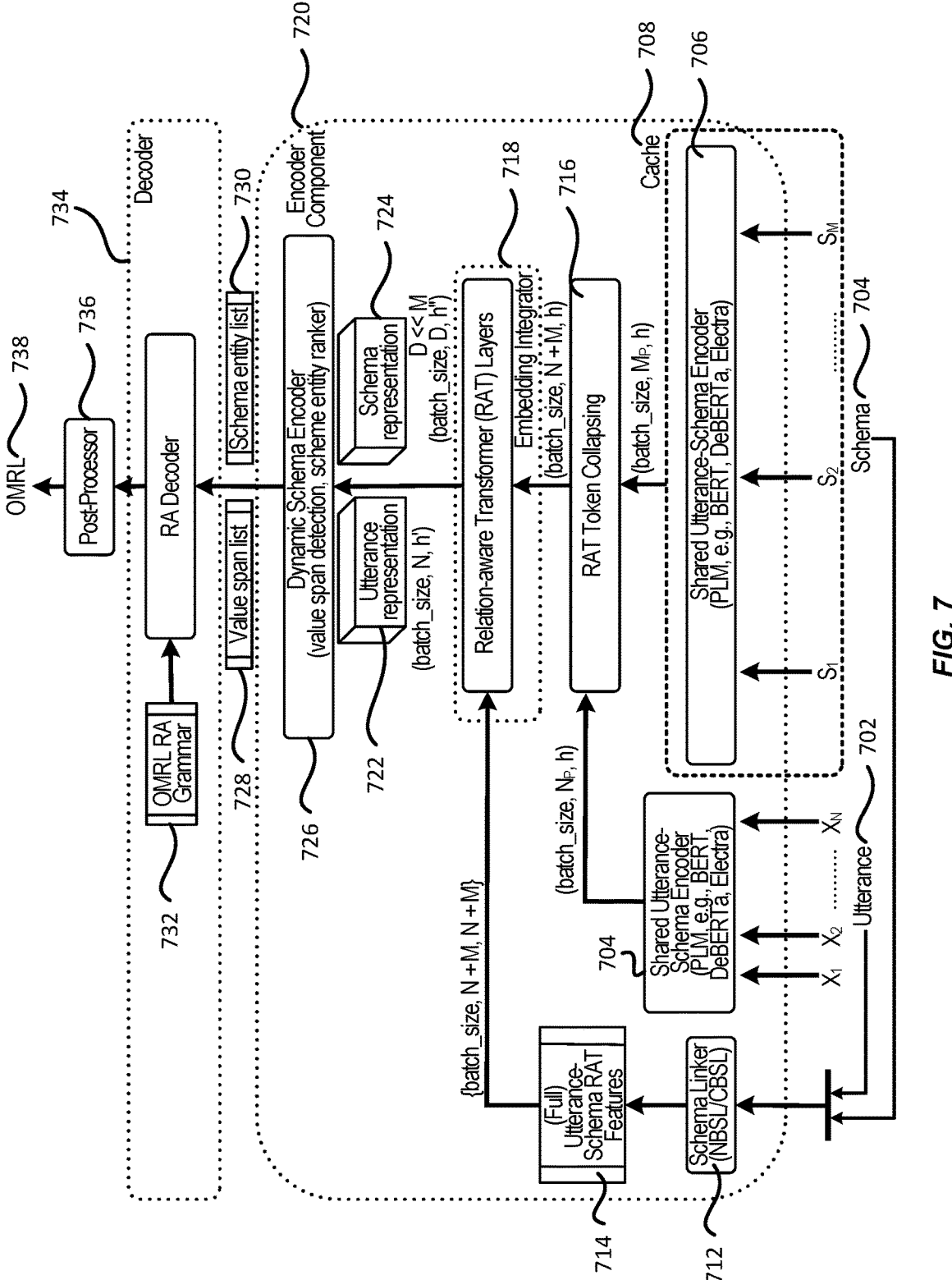
FIG. 7 illustrates an example architecture for efficient embedding using a cache in accordance with various embodiments.
Figure 8:
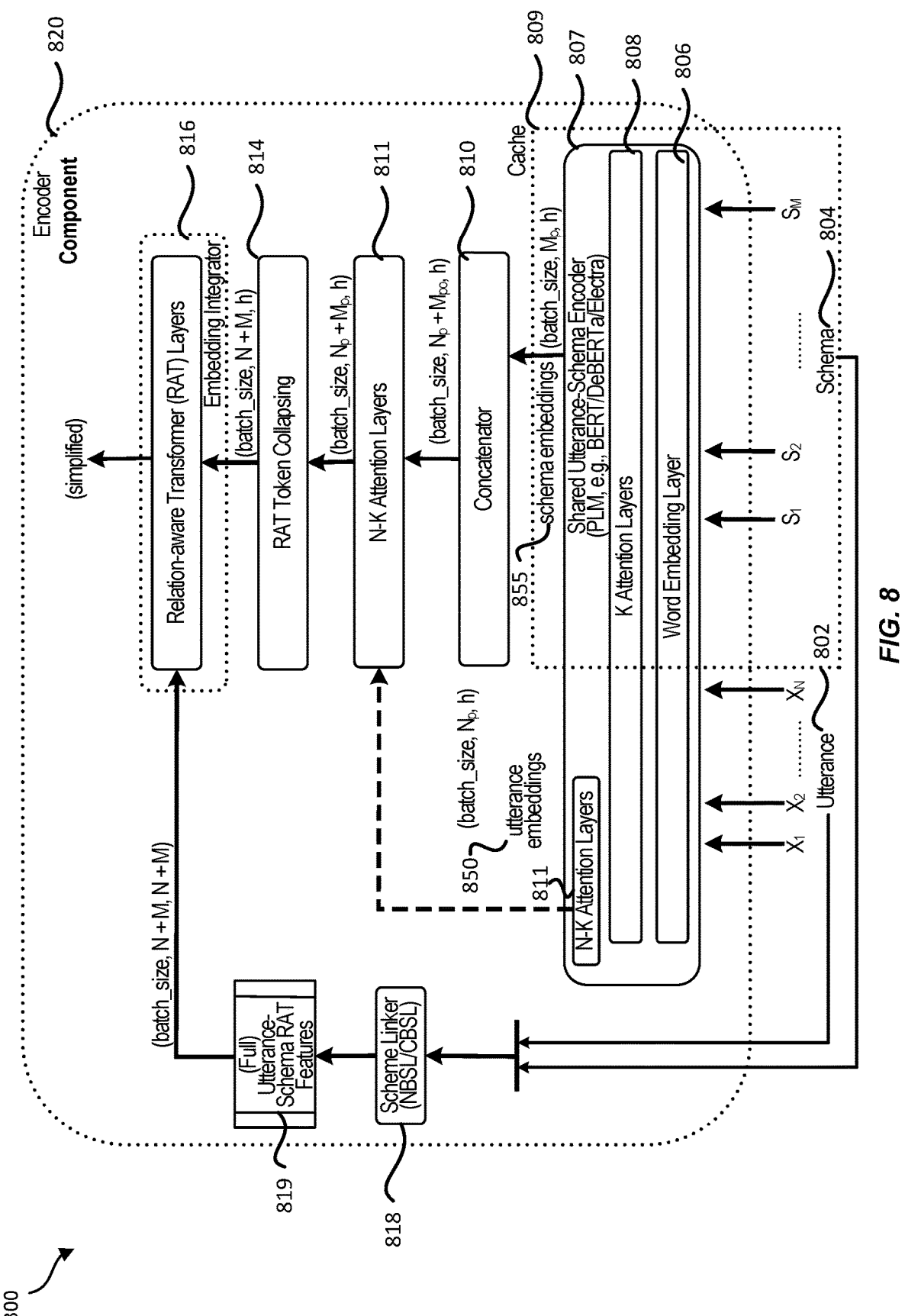
FIG. 8 illustrates an example architecture for layer-based embedding in accordance with various embodiments.

FIGS. 7 and 8 illustrate two architectures for efficient encoding, or Shared Utterance and Schema Encoders (SUSE) architectures. In the architecture depicted in FIG. 7, an utterance and fixed portion are separately provided to a shared encoder, and the encoded fixed portion is cached. The architecture depicted in FIG. 8 is similar to that of FIG. 7, with the addition of layer-based encoding and caching.

FIG. 7 illustrates an example architecture 700 for efficient embedding using a cache in accordance with various embodiments. The architecture 700 includes an encoder component 720 which includes a set of encoders configured to accept input including an utterance 702 and schema 704, coupled to a decoder 734 and post-processor 736 configured to generate an output such as OMRL 738.

A given encoder input is separated into the utterance 702 and a fixed portion, which includes schemas 704 and/or extra tokens, as described above with respect to FIGS. 5 and 6. In some aspects, a shared pretrained language model encoder 706 is used to process utterance 702 and schema 704 inputs in a separate manner so that the schema embeddings can be cached. In some instances, the shared pretrained language model encoder 706 is a PLM such as BERT, DeBERTa, ELECTRA, and/or the like.

The utterance 702 is provided as input to the shared pretrained language model encoder 706. The shared pretrained language model encoder 706 processes the utterance 702 to generate an encoded utterance.

The schemas 704 (and any other fixed portion of the input) are separately provided as input to the shared pretrained language model encoder 706. The shared pretrained language model encoder 706 processes the schemas 704 (and any other fixed portion of the input) to generate an encoded fixed portion. The encoded fixed portion is saved to a cache 708.

The encoded utterance and the encoded fixed portion are provided to a RAT token collapsing component 716. RAT token collapsing component 716 generates collapsed tokens, forming the soft token representation for each of the database schema component (entities, attributes) so that the decoder in later step will pick them up in the generative process of the final OMRL output.

In some aspects, the utterance 702 and the schemas 704 (and any other fixed portion of the input) are also provided as input to a schema linker 712. The RAT schema linker 712 encodes the relations between so-called entities (words of tables and columns) in the database schema and words in the natural language utterance (these relations are called "schema linking" relations). Schema linking serves to capture latent linking between tokens in utterances and schema (e.g., entities/attributes in OMRL or tables/columns in SQL). The schema linker 712 outputs utterance-schema RAT features 714.

In some instances, name-based schema linking (NBSL) is applied. NBSL works to produce matching between tokens in the natural language utterance and elements in the database schema representation. NBSL matches entities such as table names and column names to words in the input utterance, which can be based on an exact match or a partial match for both the primary name and its synonyms to elements in the database schema representation.

In some instances, content-based schema linking (CBSL) is applied. In CBSL for OMRL, data assets to be used in a natural language to logical form model are preprocessed based on scalable search and content-based schema linking. The preprocessing techniques combine named entity recognition and scalable searches (e.g., elastic search) to obtain CBSL matches between words or tokens of an utterance and system entities and/or values for attributes within a given database schema. The content-based schema linking matches are appended to the utterance using a unique data structure, and then the data structure is input into the natural language to logical form model. The data structure facilitates encoding and decoding of the input utterance into a logical form by the natural language to logical form model. Advantageously, by using scalable search and content-based schema linking, the natural language to logical form model response time and accuracy can be improved over conventional standardized programming language techniques such as SQL searches on the database using a SQL similarity operator. CBSL techniques are described in further detail in U.S. patent application Ser. No. 18/065,387, entitled "Transforming Natural Language To Structured Query Language Based On Scalable Search And Content-Based Schema Linking," filed Dec. 13, 2022, the entire contents of which are hereby incorporated by reference full all purposes.

The utterance-schema RAT features 714 and the collapsed tokens are provided as input to an embedding integrator 718. In some implementations, as shown in FIG. 7, the embedding integrator 718 includes RAT layers. The embedding integrator 719 combines the embeddings of the fixed portion and the embeddings of the user utterance to produce an integrated utterance representation 722 and a schema representation 724.

The utterance representation 722 and the schema representation 724 are provided to a dynamic schema encoder 726. The dynamic schema encoder 726 outputs a value span list 728 and a schema entity list 730 based on the encoded utterance and schema representations. This process is to constrain the search space of the generative process of the decoder so that only relevant parts of the schema to the user utterance are considered when producing the final OMRL output by the decoder.

The decoder 734 processes the input embeddings 618 to generate output. As described above with respect to FIG. 5, in some implementations, the decoder outputs a tree-based structure that represents the logical form. The post-processor 736 processes the decoder output to generate a logical form such as OMRL 738.

FIG. 8 illustrates an example architecture 800 for layer-based embedding in accordance with various embodiments. In some instances, separating the embeddings in a shared PLM encoder will lead to the loss of contextualized embeddings between utterance and schema. To prevent such issues, the architecture 800 can be implemented. The utterance 802, schema 804, schema linker 818, and RAT features 819 are as described above with respect to FIG. 7.

Figure 10:
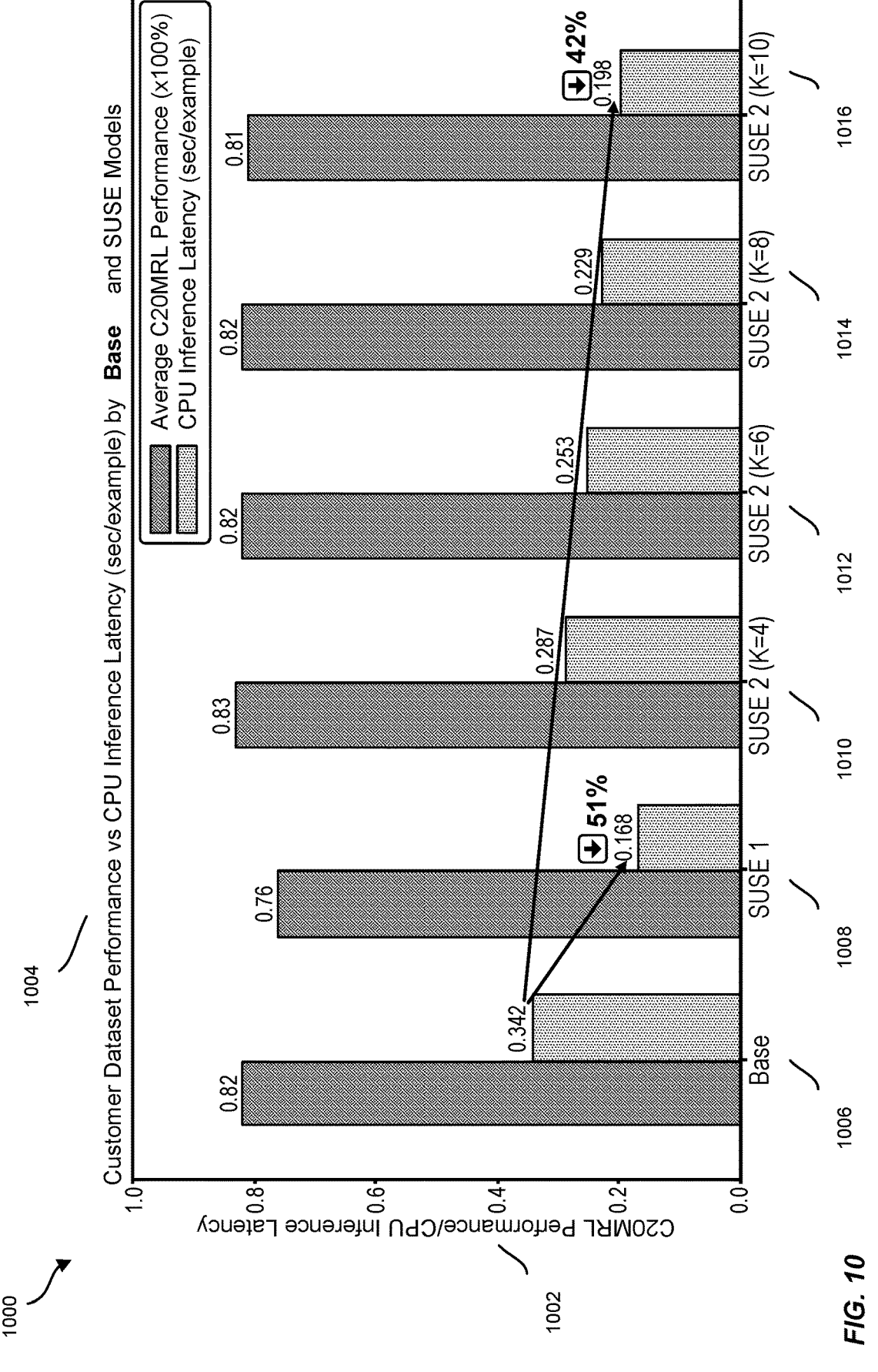
FIG. 10 depicts experimental results achieved using the techniques according to various embodiments.

The shared utterance-schema encoder 807 includes multiple layers, including a word embedding layer 806 and some number N of attention layers. In some examples, there are 12 layers. Some number K is configured, where K is an integer less than N. As shown in FIG. 10, different K values can be selected for the desired balance of speed and accuracy (e.g., K=4, 6, 8, or 10). For the first K attention layers 808, the utterance 802 and the schema 804 (and any other fixed portion of the input) are processed separately to generate utterance embeddings 850 and schema embeddings 855. The schema embeddings 855 are stored to a cache 809. For the last N-K attention layers 811, the utterance embeddings 850 and the schema embeddings 855 (and embeddings of any other fixed portion of the input) are concatenated and processed together.

The utterance embeddings 850 and schema embeddings 855 are provided to a concatenator 810. The concatenator concatenates the utterance embeddings 850 and schema embeddings 855. The concatenated utterance embeddings 850 and schema embeddings 855 are then processed by the last N-K attention layers 812.

The output of the attention layers is then processed using a RAT token collapsing component 814 and embedding integrator 816, as described above with respect to the RAT token collapsing component 716 and embedding integrator 718 of FIG. 7. In some aspects, the output of the RAT layers is then processed by a dynamic schema encoder (not pictured in FIG. 8), and the final encoder output is processed by a post-processor (not pictured in FIG. 8) to generate a logical form such as OMRL, as described above with respect to FIG. 7.

Flow for Efficient Encoding

FIG. 9 is a flowchart illustrating a process 900 for efficient encoding in accordance with various embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order, or some steps may also be performed in parallel. In certain embodiments, such as in the embodiments depicted in FIGS. 1-8, the processing depicted in FIG. 9 may be performed by a system (e.g., C2OMRL system 500) to deploy one or more machine-learning models configured for translating natural language to logical form.

At step 902, an input string is accessed. The input string includes a natural language utterance and a database schema representation for a database. The input string includes a natural language utterance such as would be received from a user, such as "What suppliers are available in Tucson?" and "Total cost for Project X?" The input string further includes a database schema representation for a database, as described above with respect to FIG. 5. In some implementations, the input string further includes extra tokens, as described above with respect to FIG. 5.

At step 904, the natural language utterance is provided to a first encoder to generate one or more embeddings of the natural language utterance. The first encoder may include or be a Pre-trained Language Model (PLM) such as BERT, DeBERTa, ROBERTa, and/or the like, as described above with respect to FIGS. 5-9. The first encoder processes the natural language utterance and produces the one or more embeddings of the natural language utterance as output.

At step 906, the database schema representation is provided to the first encoder to generate one or more embeddings of the database schema representation. The first encoder processes the database schema representation and produces the one or more embeddings of the database schema representation as output.

As described above with respect to FIG. 8, in some instances, the natural language utterance and the database schema representation are separately provided to some first subset of layers of the first encoder (e.g., the first K attention layers, as illustrated in FIG. 8). The natural language utterance is processed by the first subset of layers of the first encoder to generate one or more utterance embeddings. The database schema representation (and optionally any other fixed portion of the input) is processed by the first subset of layers of the first encoder to generate one or more schema embeddings. In some instances, the schema embeddings are cached. The utterance embeddings and the schema embeddings are concatenated to generate one or more concatenated embeddings. The concatenated embeddings are provided to a second subset of the layers of the first encoder (e.g., the next N-K attention layers, as shown in FIG. 8). The output of the first encoder is the one or more embeddings of the natural language utterance, and the one or more embeddings of the database schema representation, which may be in the form of joint utterance-schema embeddings.

In some aspects, the value of K is a configurable integer. In some instances, K is a hyperparameter of the model which is configured using a hypertuning process. Higher K values correspond to a larger cache but can have less accurate results. Lower K values will have higher accuracy but may have longer processing times. Experimental results with different K values are shown in FIG. 10. By processing the utterance and schema separately for some layers and together for other layers, the model is able to learn contextualization between the utterance and schema while still caching partial schema embeddings and saving processing time and power.

As noted above, in some implementations, the input string further comprises one or more tokens. In some instances, the one or more tokens are provided to the first encoder to generate one or more embeddings of the one or more tokens.

In some instances, the one or more embeddings of the database schema representation are cached. The system stores the embeddings of the database schema to a cache, so that the embeddings of the database schema do not need to be recomputed. In some instances, the cache includes a local cache. In some examples, one or more operations are performed by a remote server responsive to a request from a local computing device. The cache may be implemented on the remote server or the local computing device. As described above, in some aspects, extra tokens are also embedded. In such cases, the extra tokens are also stored to the cache. As described above with respect to FIG. 8, in the layer-based implementation, the schema embeddings output by the first K layers of the first encoder are cached.

At step 908, a second encoder encodes relations between elements in the database schema representation and words in the natural language utterance based on the one or more embeddings of the natural language utterance and the one or more embeddings of the database schema representation. As described above with respect to FIGS. 5-8, the second encoder may include or be Relation-Aware Transformer (RAT). In some aspects, the second encoder includes multiple self-attention layers configured to apply self-attention to the one or more embeddings to identify relations between the entities in the database schema representation and words in the natural language utterance. Use of RATs is described in Wang et al., *RAT-SQL: Relation-Aware Schema Encoding and Linking for Text-to-SQL Parsers* (2021), the entire contents of which are hereby incorporated by reference full all purposes.

In some instances, the elements in the database schema can include table names, column names, row names, fields, relationships, views indexes, directories, and/or other database schema elements. The generated one or more embeddings are provided from the first encoder to the second encoder. In some instances, the second encoder also receives as input schema-linking relations that link elements in the database schema representation and words in the natural language utterance are also provided to the second encoder, and the embeddings are further generated based on the schema-linking relations. The schema-linking relations provide information to help the second encoder identify how the elements in the database schema representation relate to the words in the natural language utterance. Schema linking serves to capture latent linking between tokens in utterances and schema (e.g., entities/attributes in OMRL or tables/columns in SQL). The schema linking relations are encoded into layers of the second encoder as prior knowledge.

At step 910, a logical form for the natural language utterance is generated based on the encoded relations, the one or more embeddings of the natural language utterance, and the one or more embeddings of the database schema representation.

In some aspects, a grammar-based decoder generates the logical form based on the encoded relations, the one or more embeddings of the natural language utterance, and the one or more embeddings of the database schema representation. In some instances, the logical form is an intermediate database query representation corresponding to the input utterance. As described above with respect to FIG. 5, in some examples, the grammar-based decoder applies a bottom-up generative process using a beam search to generate an OMRL tree that represents the full OMRL logical form. The grammar-based decoder obtains one or more raw beam scores generated from one or more beam levels of the grammar-based decoder. The one or more raw beam scores are used to classify the intermediate database query representation as correct or incorrect.

In some instances, relational algebra (RA) grammar is further provided to the grammar-based decoder. The RA grammar represents the logical form as a tree. The RA grammar uses configured RA operators to represent the logical form. The RA grammar is used to control the syntax of the decoder output to ensure that the generated logical form will have proper syntax, which will influence the processing steps later (such as, e.g., execution over existing databases).

In some instances, the cached embeddings of the database schema representation are used to process subsequent input efficiently. For example, the input string is a first input string and the natural language utterance is a first natural language utterance. Subsequently, a second input string comprising a second natural language utterance and the database schema representation is accessed. The second natural language utterance is provided to the first encoder to generate one or more embeddings of the second natural language utterance. The one or more embeddings of the database schema representation are retrieved from the cache. The second encoder encodes relations between elements in the database schema representation and words in the second natural language utterance based on the one or more embeddings of the second natural language utterance and the one or more embeddings of the database schema representation, in a similar fashion as described above with respect to step 908. A logical form is generated for the second natural language utterance based on the encoded relations, the one or more embeddings of the second natural language utterance, and the one or more embeddings of the database schema representation, in a similar fashion as described above with respect to step 910.

Experimental Results

The embedding techniques described above provide significant improvements in efficiency. Experimental results are shown in FIG. 10, which shows C2OMRL performance and CPU inference latency 1002 for different architectures as described herein. Customer dataset performance vs CPU inference latency (see/example) 1004 is shown for base and SUSE models. The experiments used to generate the statistics shown in FIG. 10 were conducted using the scenarios of C2OMRL and C2SQL. The base 1006 is use of the semantic parser without encoder embedding caching, and the remaining examples use embedder caching with different parameters.

Without encoder embedding caching, the base 1006 values are 0.82 average C2OMRL performance (x 100%) and 0.32 CPU inference latency (see/example). For SUSE 1 1008 (i.e., the architecture depicted in FIG. 7), the average C2OMRL performance is 0.76 and the CPU inference latency is 0.168, providing a 51% reduction in latency. The remaining entries are for SUSE 2 (i.e., the architecture depicted in FIG. 8), with different K values. For K=4 1010, the average C2OMRL performance is 0.83 and the CPU inference latency is 0.287. For K=6 1012, the average C2OMRL performance is 0.82 and the CPU inference latency is 0.253. For K=8 1014, the average C2OMRL performance is 0.82 and the CPU inference latency is 0.229. For K=10 1016, the average C2OMRL performance is 0.81 and the CPU inference latency is 0.198, providing a 42% reduction in latency. As shown in FIG. 10 the techniques described herein provide significant speed improvements on the order of 50% improvements over prior systems while maintaining good accuracy.

Illustrative Systems

FIG. 10 depicts a simplified diagram of a distributed system 1000. In the illustrated example, distributed system 1000 includes one or more client computing devices 1002, 1004, 1006, and 1008, coupled to a server 1012 via one or more communication networks 1010. Clients computing devices 1002, 1004, 1006, and 1008 may be configured to execute one or more applications.

In various examples, server 1012 may be adapted to run one or more services or software applications that enable one or more embodiments described in this disclosure. In certain examples, server 1012 may also provide other services or software applications that may include non-virtual and virtual environments. In some examples, these services may be offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may include one or more components 1018, 1020 and 1022 that implement the functions performed by server 1012. These components may include software components that may be executed by one or more processors, hardware components, or combinations thereof. It should be appreciated that various different system configurations are possible, which may be different from distributed system 1000. The example shown in FIG. 10 is thus one example of a distributed system for implementing an example system and is not intended to be limiting.

Users may use client computing devices 1002, 1004, 1006, and/or 1008 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows® Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1010 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1010 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 may include one or more virtual machines running virtual operating systems, or other computing architectures involving virtualization such as one or more flexible pools of logical storage devices that may be virtualized to maintain virtual storage devices for the server. In various examples, server 1012 may be adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014, 1016. These data repositories may be used to store data and other information in certain examples. For example, one or more of the data repositories 1014, 1016 may be used to store information such as information related to chatbot performance or generated models for use by chatbots used by server 1012 when performing various functions in accordance with various embodiments. Data repositories 1014, 1016 may reside in a variety of locations. For example, a data repository used by server 1012 may be local to server 1012 or may be remote from server 1012 and in communication with server 1012 via a network-based or dedicated connection. Data repositories 1014, 1016 may be of different types. In certain examples, a data repository used by server 1012 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1014, 1016 may also be used by applications to store application data. The data repositories used by applications may be of different types such as, for example, a key-value store repository, an object store repository, or a general storage repository supported by a file system.

Figure 11:
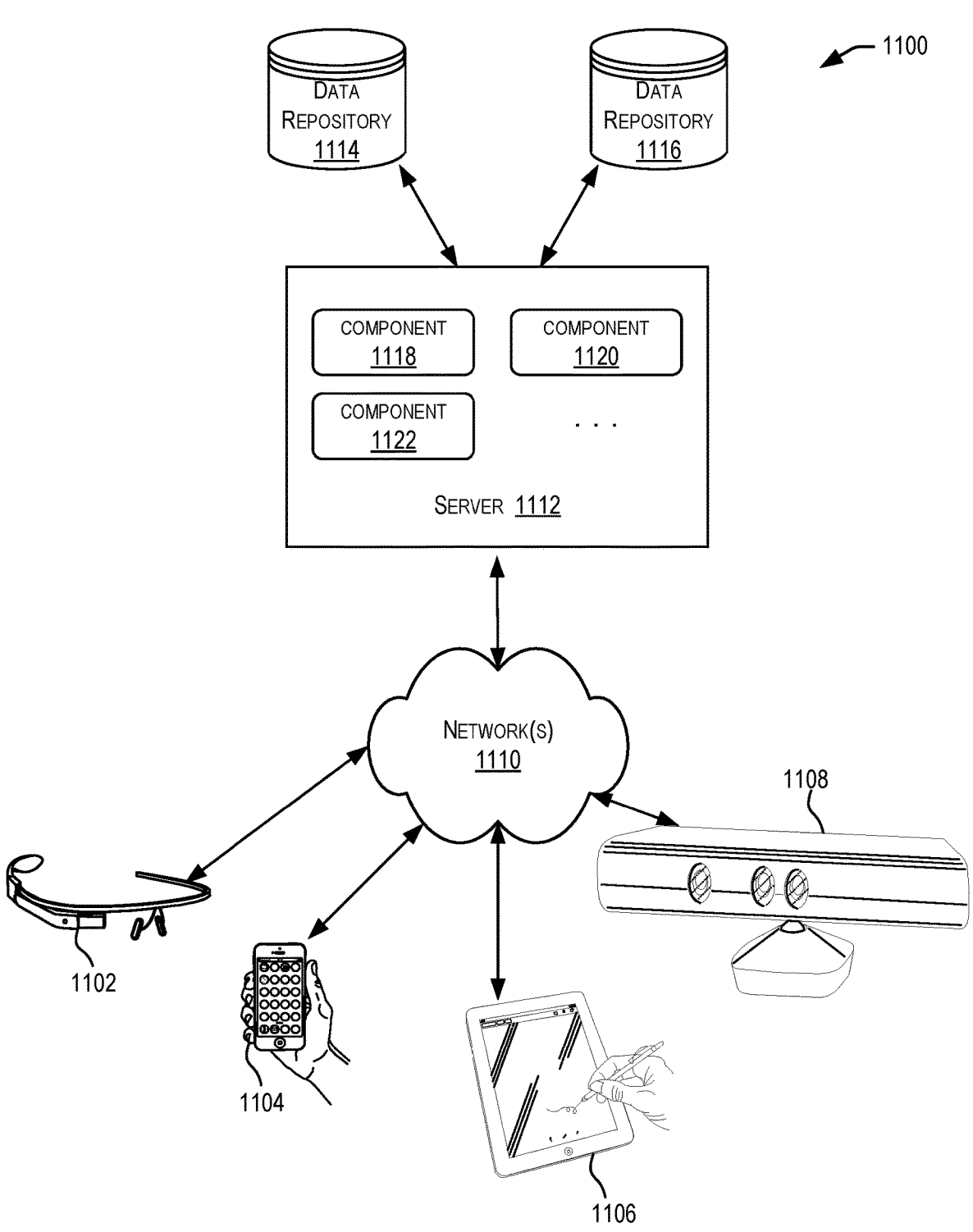
FIG. 11 depicts a simplified diagram of a distributed system for implementing various embodiments.

In certain examples, the functionalities described in this disclosure may be offered as services via a cloud environment. FIG. 11 is a simplified block diagram of a cloud-based system environment in which various services may be offered as cloud services in accordance with certain examples. In the example depicted in FIG. 11, cloud infrastructure system 1102 may provide one or more cloud services that may be requested by users using one or more client computing devices 1104, 1106, and 1108. Cloud infrastructure system 1102 may comprise one or more computers and/or servers that may include those described above for server 1012. The computers in cloud infrastructure system 1102 may be organized as general purpose computers, specialized server computers, server farms, server clusters, or any other appropriate arrangement and/or combination.

Network(s) 1110 may facilitate communication and exchange of data between clients 1104, 1106, and 1108 and cloud infrastructure system 1102. Network(s) 1110 may include one or more networks. The networks may be of the same or different types. Network(s) 1110 may support one or more communication protocols, including wired and/or wireless protocols, for facilitating the communications.

The example depicted in FIG. 11 is only one example of a cloud infrastructure system and is not intended to be limiting. It should be appreciated that, in some other examples, cloud infrastructure system 1102 may have more or fewer components than those depicted in FIG. 11, may combine two or more components, or may have a different configuration or arrangement of components. For example, although FIG. 11 depicts three client computing devices, any number of client computing devices may be supported in alternative examples.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1102. Cloud infrastructure system 1102 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1102 may be configured to provide one or even multiple cloud services.

Cloud infrastructure system 1102 may provide the cloud services via different deployment models. In a public cloud model, cloud infrastructure system 1102 may be owned by a third party cloud services provider and the cloud services are offered to any general public customer, where the customer may be an individual or an enterprise. In certain other examples, under a private cloud model, cloud infrastructure system 1102 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1102 and the services provided may be shared by several organizations in a related community. Various other models such as hybrids of the above mentioned models may also be used.

Client computing devices 1104, 1106, and 1108 may be of different types (such as client computing devices 1002, 1004, 1006, and 1008 depicted in FIG. 10) and may be capable of operating one or more client applications. A user may use a client device to interact with cloud infrastructure system 1102, such as to request a service provided by cloud infrastructure system 1102. For example, a user may use a client device to request information or action from a chatbot as described in this disclosure.

In some examples, the processing performed by cloud infrastructure system 1102 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1102 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 11, cloud infrastructure system 1102 may include infrastructure resources 1130 that are utilized for facilitating the provision of various cloud services offered by cloud infrastructure system 1102. Infrastructure resources 1130 may include, for example, processing resources, storage or memory resources, networking resources, and the like. In certain examples, the storage virtual machines that are available for servicing storage requested from applications may be part of cloud infrastructure system 1102. In other examples, the storage virtual machines may be part of different systems.

In certain examples, to facilitate efficient provisioning of these resources for supporting the various cloud services provided by cloud infrastructure system 1102 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1102 may itself internally use services 1132 that are shared by different components of cloud infrastructure system 1102 and which facilitate the provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1102 may comprise multiple subsystems. These subsystems may be implemented in software, or hardware, or combinations thereof. As depicted in FIG. 11, the subsystems may include a user interface subsystem 1112 that enables users or customers of cloud infrastructure system 1102 to interact with cloud infrastructure system 1102. User interface subsystem 1112 may include various different interfaces such as a web interface 1114, an online store interface 1116 where cloud services provided by cloud infrastructure system 1102 are advertised and are purchasable by a consumer, and other interfaces 1118. For example, a customer may, using a client device, request (service request 1134) one or more services provided by cloud infrastructure system 1102 using one or more of interfaces 1114, 1116, and 1118. For example, a customer may access the online store, browse cloud services offered by cloud infrastructure system 1102, and place a subscription order for one or more services offered by cloud infrastructure system 1102 that the customer wishes to subscribe to. The service request may include information identifying the customer and one or more services that the customer desires to subscribe to. For example, a customer may place a subscription order for a service offered by cloud infrastructure system 1102. As part of the order, the customer may provide information identifying a chatbot system for which the service is to be provided and optionally one or more credentials for the chatbot system.

In certain examples, such as the example depicted in FIG. 11, cloud infrastructure system 1102 may comprise an order management subsystem (OMS) 1120 that is configured to process the new order. As part of this processing, OMS 1120 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1120 may then invoke the order provisioning subsystem (OPS) 1124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1124 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1102 as part of the provisioning process. Cloud infrastructure system 1102 may generate an application ID and select a storage virtual machine for an application from among storage virtual machines provided by cloud infrastructure system 1102 itself or from storage virtual machines provided by other systems other than cloud infrastructure system 1102.

Cloud infrastructure system 1102 may send a response or notification 1144 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1102 and information identifying a chatbot system selected by cloud infrastructure system 1102 for the chatbot system corresponding to the chatbot system ID.

Cloud infrastructure system 1102 may provide services to multiple customers. For each customer, cloud infrastructure system 1102 is responsible for managing information related to one or more subscription orders received from the customer, maintaining customer data related to the orders, and providing the requested services to the customer. Cloud infrastructure system 1102 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1102 may provide services to multiple customers in parallel. Cloud infrastructure system 1102 may store information for these customers, including possibly proprietary information. In certain examples, cloud infrastructure system 1102 comprises an identity management subsystem (IMS) 1128 that is configured to manage customer information and provide the separation of the managed information such that information related to one customer is not accessible by another customer. IMS 1128 may be configured to provide various security-related services such as identity services, such as information access management, authentication and authorization services, services for managing customer identities and roles and related capabilities, and the like.

Figure 12:
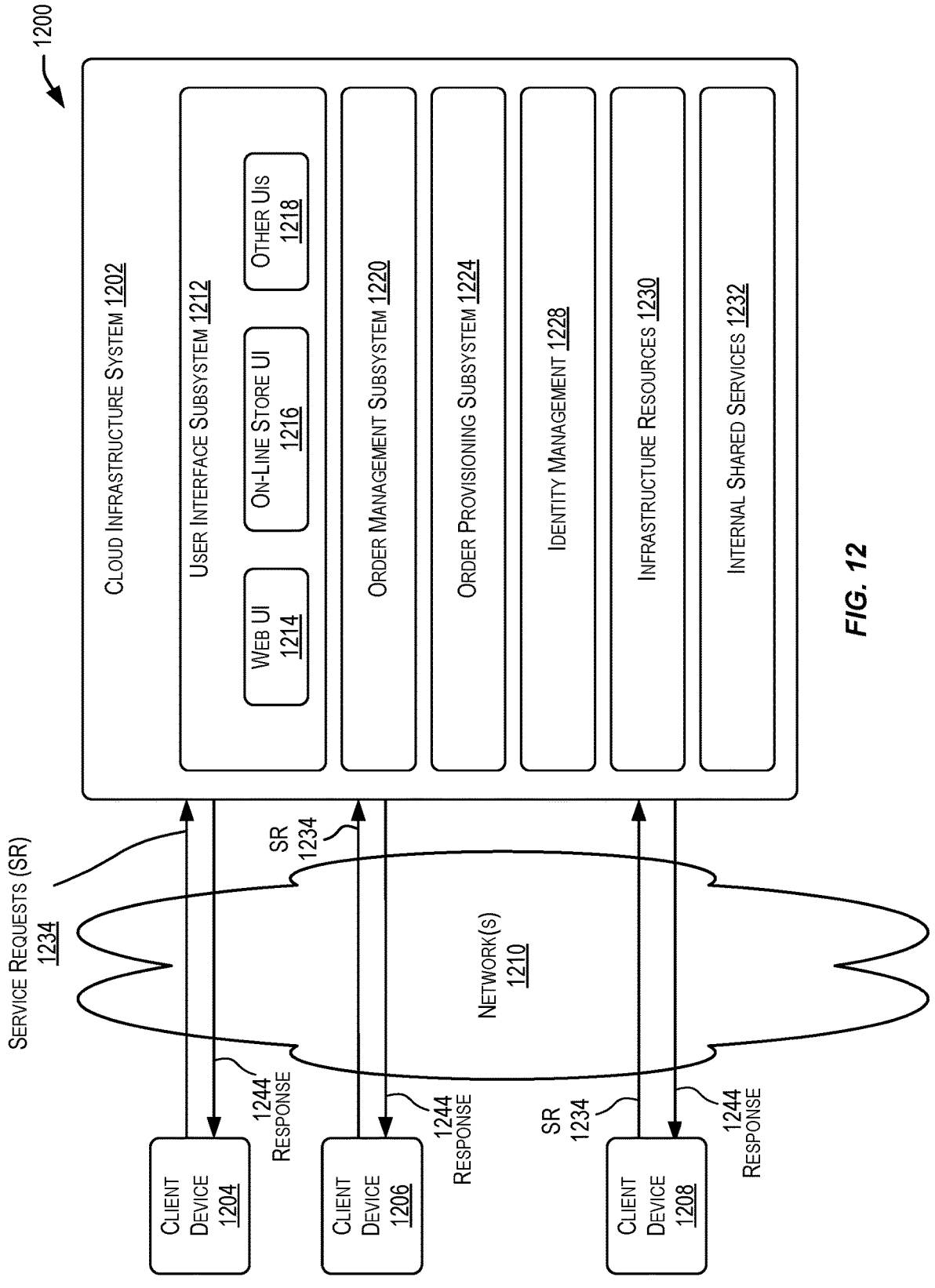
FIG. 12 is a simplified block diagram of one or more components of a system environment by which services provided by one or more components of an embodiment system may be offered as cloud services, in accordance with various embodiments.
Figure 13:
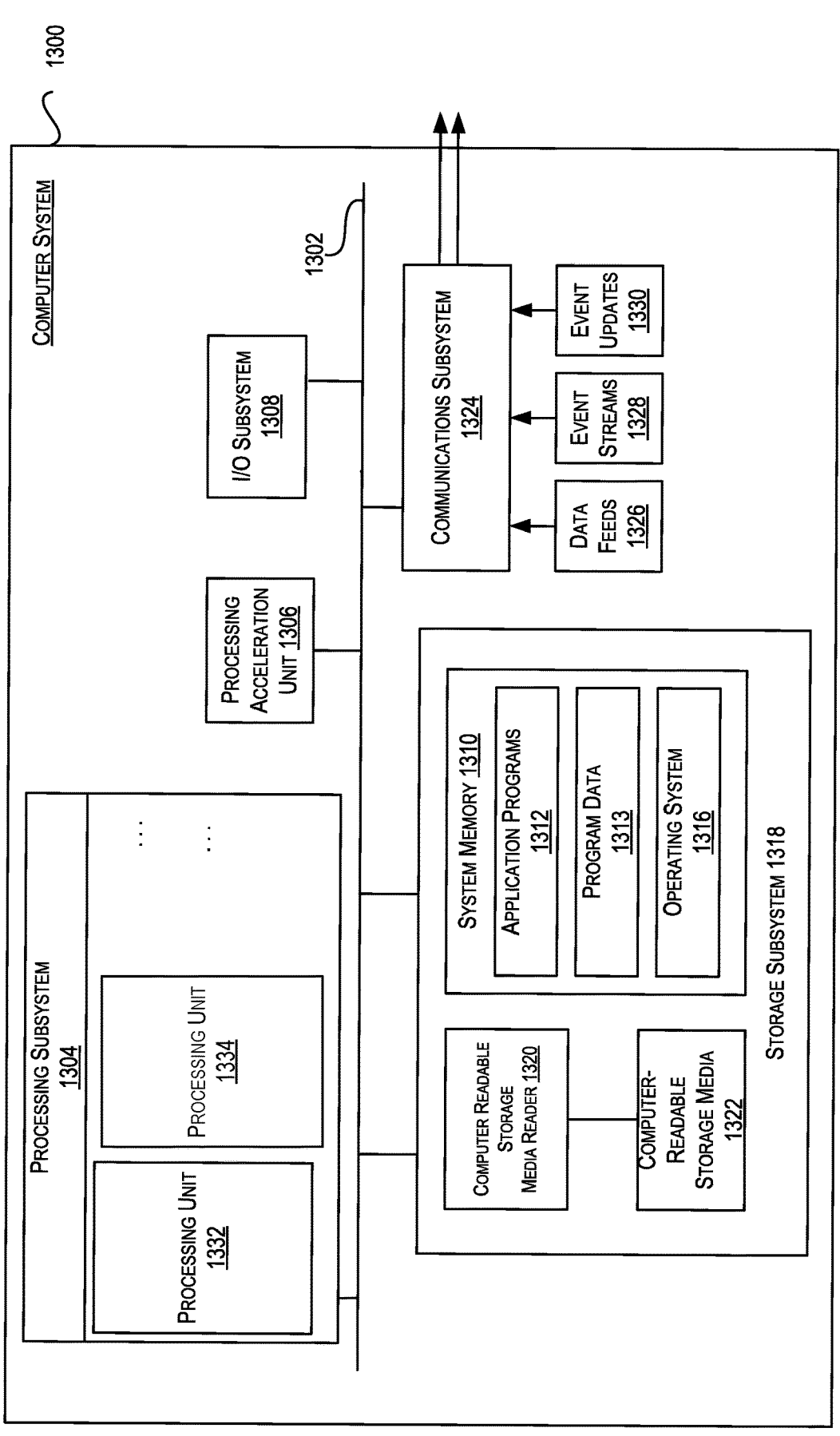
FIG. 13 illustrates an example computer system that may be used to implement various embodiments.

FIG. 12 illustrates an example of computer system 1200. In some examples, computer system 1200 may be used to implement any of the digital assistant or chatbot systems within a distributed environment, and various servers and computer systems described above. As shown in FIG. 12, computer system 1200 includes various subsystems including a processing subsystem 1204 that communicates with a number of other subsystems via a bus subsystem 1202. These other subsystems may include a processing acceleration unit 1206, an I/O subsystem 1208, a storage subsystem 1218, and a communications subsystem 1224. Storage subsystem 1218 may include non-transitory computer-readable storage media including storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative examples of the bus subsystem may utilize multiple buses. Bus subsystem 1202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include be single core or multicore processors. The processing resources of computer system 1200 may be organized into one or more processing units 1232, 1234, etc. A processing unit may include one or more processors, one or more cores from the same or different processors, a combination of cores and processors, or other combinations of cores and processors. In some examples, processing subsystem 1204 may include one or more special purpose co-processors such as graphics processors, digital signal processors (DSPs), or the like. In some examples, some or all of the processing units of processing subsystem 1204 may be implemented using customized circuits, such as application specific integrated circuits (ASICs), or field programmable gate arrays (FPGAs).

In some examples, the processing units in processing subsystem 1204 may execute instructions stored in system memory 1210 or on computer readable storage media 1222. In various examples, the processing units may execute a variety of programs or code instructions and may maintain multiple concurrently executing programs or processes. At any given time, some or all of the program code to be executed may be resident in system memory 1210 and/or on computer-readable storage media 1222 including potentially on one or more storage devices. Through suitable programming, processing subsystem 1204 may provide various functionalities described above. In instances where computer system 1200 is executing one or more virtual machines, one or more processing units may be allocated to each virtual machine.

In certain examples, a processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides a tangible non-transitory computer-readable storage medium for storing the basic programming and data constructs that provide the functionality of some examples. Storage subsystem 1218 may store software (e.g., programs, code modules, instructions) that when executed by processing subsystem 1204 provides the functionality described above. The software may be executed by one or more processing units of processing subsystem 1204. Storage subsystem 1218 may also provide authentication in accordance with the teachings of this disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1222 may store programming and data constructs that provide the functionality of some examples. Computer-readable media 1222 may provide storage of computer-readable instructions, data structures, program modules, and other data for computer system 1200. Software (programs, code modules, instructions) that, when executed by processing subsystem 1204 provides the functionality described above, may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1218 may also include a computer-readable storage media reader 1220 that may further be connected to computer-readable storage media 1222. Reader 1220 may receive and be configured to read data from a memory device such as a disk, a flash drive, etc.

In certain examples, computer system 1200 may support virtualization technologies, including but not limited to virtualization of processing and memory resources. For example, computer system 1200 may provide support for executing one or more virtual machines. In certain examples, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. For example, when computer system 1200 is used to implement bot system 120 depicted in FIG. 1, the communication subsystem may be used to communicate with a chatbot system selected for an application.

Communication subsystem 1224 may support both wired and/or wireless communication protocols. In certain examples, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1224 may provide wired network connectivity (e.g., Ethernet) in addition to or instead of a wireless interface.

Communication subsystem 1224 may receive and transmit data in various forms. In some examples, in addition to other forms, communications subsystem 1224 may receive input communications in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to communicate data from computer system 1200 to other computer systems or networks. The data may be communicated in various different forms such as structured and/or unstructured data feeds 1226, event streams 1228, event updates 1230, and the like to one or more databases that may be in communication with one or more streaming data source computers coupled to computer system 1200.

Computer system 1200 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, it should be appreciated there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
accessing an input string comprising a natural language utterance and a database schema representation for a database;
providing the natural language utterance to a first subset of layers of a first encoder comprising a plurality of layers to generate one or more utterance embedding;
providing the database schema representation to the first subset of the layers of the first encoder to generate one or more schema embeddings;
concatenating the one or more utterance embeddings and the one or more schema embeddings to generate one or more concatenated embeddings;
providing the one or more concatenated embeddings to a second subset of the layers of the first encoder to generate one or more embeddings of the natural language utterance and one or more embeddings of the database schema representation;
encoding, by a second encoder, relations between elements in the database schema representation and words in the natural language utterance based on the one or more embeddings of the natural language utterance and the one or more embeddings of the database schema representation; and
generating a logical form for the natural language utterance based on the encoded relations, the one or more embeddings of the natural language utterance, and the one or more embeddings of the database schema representation.

2. The method of claim 1, wherein the input string is a first input string and the natural language utterance is a first natural language utterance, the method further comprising:
storing the one or more embeddings of the database schema representation to a cache;
accessing a second input string comprising a second natural language utterance and the database schema representation;

providing the second natural language utterance to the first encoder to generate one or more embeddings of the second natural language utterance;
retrieving the one or more embeddings of the database schema representation from the cache;
encoding, by the second encoder, relations between elements in the database schema representation and words in the second natural language utterance based on the one or more embeddings of the second natural language utterance and the one or more embeddings of the database schema representation; and
generating a logical form for the second natural language utterance based on the encoded relations, the one or more embeddings of the second natural language utterance, and the one or more embeddings of the database schema representation.

3. The method of claim 2, wherein the cache comprises a local cache.

4. The method of claim 1, wherein:
the first encoder comprises N layers;
the first subset of the layers comprises K layers, wherein K is a configurable integer less than N; and
the second subset of the layers comprises N-K layers.

5. The method of claim 1, wherein the input string further comprises one or more tokens, and the method further comprises:
providing the one or more tokens to the first encoder to generate one or more embeddings of the one or more tokens; and
caching the one or more embeddings of the one or more tokens.

6. The method of claim 1, wherein:
the first encoder is a Pre-trained Language Model (PLM); and
the second encoder is a Relation-Aware Transformer (RAT).

7. A system comprising:
one or more processors; and
one or more computer-readable media storing instructions which, when executed by the one or more processors, cause the system to perform operations comprising:
accessing an input string comprising a natural language utterance and a database schema representation for a database;
providing the natural language utterance to a first subset of layers of a first encoder comprising a plurality of layers to generate one or more utterance embeddings;
providing the database schema representation to the first subset of the layers of the first encoder to generate one or more schema embeddings;
concatenating the one or more utterance embeddings and the one or more schema embeddings to generate one or more concatenated embeddings;
providing the one or more concatenated embeddings to a second subset of the layers of the first encoder to generate one or more embeddings of the natural language utterance and one or more embeddings of the database schema representation;
encoding, by a second encoder, relations between elements in the database schema representation and words in the natural language utterance based on the one or more embeddings of the natural language utterance and the one or more embeddings of the database schema representation; and
generating a logical form for the natural language utterance based on the encoded relations, the one or more embeddings of the natural language utterance, and the one or more embeddings of the database schema representation.

8. The system of claim 7, wherein the input string is a first input string and the natural language utterance is a first natural language utterance, the operations further comprising:

storing the one or more embeddings of the database schema representation to a cache;

accessing a second input string comprising a second natural language utterance and the database schema representation;

providing the second natural language utterance to the first encoder to generate one or more embeddings of the second natural language utterance;

retrieving the one or more embeddings of the database schema representation from the cache;

encoding, by the second encoder, relations between elements in the database schema representation and words in the second natural language utterance based on the one or more embeddings of the second natural language utterance and the one or more embeddings of the database schema representation; and generating a logical form for the second natural language utterance based on the encoded relations, the one or more embeddings of the second natural language utterance, and the one or more embeddings of the database schema representation.

9. The system of claim 8, wherein the cache comprises a local cache.

10. The system of claim 7, wherein:

the first encoder comprises N layers;

the first subset of the layers comprises K layers, wherein K is a configurable integer less than N; and the second subset of the layers comprises N-K layers.

11. The system of claim 7, wherein the input string further comprises one or more tokens, and the operations further comprise:

providing the one or more tokens to the first encoder to generate one or more embeddings of the one or more tokens; and caching the one or more embeddings of the one or more tokens.

12. The system of claim 7, wherein:

the first encoder is a Pre-trained Language Model (PLM); and the second encoder is a Relation-Aware Transformer (RAT).

13. One or more non-transitory computer-readable media storing instructions which, when executed by one or more processors, cause a system to perform operations comprising:

accessing an input string comprising a natural language utterance and a database schema representation for a database;

providing the natural language utterance to a first subset of layers of a first encoder comprising a plurality of layers to generate one or more utterance embeddings;

providing the database schema representation to the first subset of the layers of the first encoder to generate one or more schema embeddings;

concatenating the one or more utterance embeddings and the one or more schema embeddings to generate one or more concatenated embeddings;

providing the one or more concatenated embeddings to a second subset of the layers of the first encoder to generate one or more embeddings of the natural language utterance and one or more embeddings of the database schema representation;

encoding, by a second encoder, relations between elements in the database schema representation and words in the natural language utterance based on the one or more embeddings of the natural language utterance and the one or more embeddings of the database schema representation; and generating a logical form for the natural language utterance based on the encoded relations, the one or more embeddings of the natural language utterance, and the one or more embeddings of the database schema representation.

14. The one or more non-transitory computer-readable media of claim 13, wherein the input string is a first input string and the natural language utterance is a first natural language utterance, the operations further comprising:

storing the one or more embeddings of the database schema representation to a cache;

accessing a second input string comprising a second natural language utterance and the database schema representation;

providing the second natural language utterance to the first encoder to generate one or more embeddings of the second natural language utterance;

retrieving the one or more embeddings of the database schema representation from the cache;

encoding, by the second encoder, relations between elements in the database schema representation and words in the second natural language utterance based on the one or more embeddings of the second natural language utterance and the one or more embeddings of the database schema representation; and generating a logical form for the second natural language utterance based on the encoded relations, the one or more embeddings of the second natural language utterance, and the one or more embeddings of the database schema representation.

15. The one or more non-transitory computer-readable media of claim 14, wherein the cache comprises a local cache.

16. The one or more non-transitory computer-readable media of claim 13, wherein:

the first encoder comprises N layers;

the first subset of the layers comprises K layers, wherein K is a configurable integer less than N; and the second subset of the layers comprises N-K layers.

17. The one or more non-transitory computer-readable media of claim 13, wherein the input string further comprises one or more tokens, and the operations further comprise:

providing the one or more tokens to the first encoder to generate one or mor embeddings of the one or more tokens; and caching the one or more embeddings of the one or more tokens.

\* \* \* \* \*